United States Patent
Lin

(10) Patent No.: US 12,450,136 B2
(45) Date of Patent: Oct. 21, 2025

(54) METHOD FOR FACILITATING TESTING FOR AN INTERCONNECTION PROTOCOL, A CONTROLLER, AND AN ELECTRONIC DEVICE

(71) Applicant: SK hynix Inc., Icheon-si (KR)

(72) Inventor: Wen Jyh Lin, Zhubei (TW)

(73) Assignee: SK hynix Inc., Icheon-si (KR)

( * ) Notice: Subject to any disclaimer, the term of this patent is extended or adjusted under 35 U.S.C. 154(b) by 0 days.

(21) Appl. No.: 18/481,911

(22) Filed: Oct. 5, 2023

(65) Prior Publication Data

US 2024/0118983 A1    Apr. 11, 2024

Related U.S. Application Data

(60) Provisional application No. 63/415,166, filed on Oct. 11, 2022.

(30) Foreign Application Priority Data

Aug. 7, 2023  (TW) ................................. 112129561

(51) Int. Cl.
    *G06F 11/00*  (2006.01)
    *G06F 11/22*  (2006.01)
    *G06F 11/263* (2006.01)

(52) U.S. Cl.
    CPC .......... *G06F 11/221* (2013.01); *G06F 11/263* (2013.01)

(58) Field of Classification Search
    CPC .............................. G06F 11/221; G06F 11/263
    See application file for complete search history.

(56) References Cited

U.S. PATENT DOCUMENTS

| | | | |
|---|---|---|---|
| 5,579,476 A | * | 11/1996 | Cheng ................. G06F 11/3688 714/39 |
| 6,880,111 B2 | | 4/2005 | Fanning |
| 10,254,972 B2 | | 4/2019 | Iwai et al. |
| 10,534,034 B2 | * | 1/2020 | Froelich .......... G01R 31/31703 |
| 10,606,710 B2 | | 3/2020 | Kim et al. |
| 10,873,429 B1 | | 12/2020 | Kwon et al. |
| 11,336,445 B2 | * | 5/2022 | Anslot ................. H04L 9/3271 |
| 11,546,087 B2 | * | 1/2023 | Jeong ................... H04L 1/0041 |
| 11,687,420 B2 | | 6/2023 | Lin et al. |

(Continued)

FOREIGN PATENT DOCUMENTS

WO        2022078426 A1    4/2022

*Primary Examiner* — Amine Riad
(74) *Attorney, Agent, or Firm* — WILLIAM PARK & ASSOCIATES LTD.

(57) ABSTRACT

Method for facilitating testing for an interconnection protocol, a controller, and an electronic device are provided. The method is suitable for an electronic device capable of communicating with another electronic device. The method comprises the following steps. At a controller of the electronic device, a test mode request signal is received to enter a test mode in which data transmission is to be performed by using an advanced line encoding having an improved effective data rate as compared to 8b/10b encoding. At the controller, a test data signal is generated to indicate a test pattern including an ordered set portion and a data pattern portion by using the advanced line encoding. The test data signal is transmitted according to the advanced line encoding through the electronic device to the other electronic device.

20 Claims, 17 Drawing Sheets

(56) References Cited

U.S. PATENT DOCUMENTS

| | | | |
|---|---|---|---|
| 11,722,469 B2* | 8/2023 | Kravitz | G06F 21/602 |
| | | | 713/171 |
| 2008/0285678 A1 | 11/2008 | Karaki | |
| 2010/0165896 A1 | 7/2010 | Gong et al. | |
| 2011/0066921 A1 | 3/2011 | Blackmon et al. | |
| 2011/0076953 A1 | 3/2011 | Macrae | |
| 2012/0120960 A1 | 5/2012 | Nishioka | |
| 2013/0061099 A1 | 3/2013 | Radulescu | |
| 2013/0179628 A1 | 7/2013 | Sekiya | |
| 2016/0246667 A1 | 8/2016 | Kumar Rao | |
| 2016/0364309 A1* | 12/2016 | Park | G06F 13/4282 |
| 2017/0093521 A1 | 3/2017 | Wang et al. | |
| 2017/0220517 A1 | 8/2017 | Khan et al. | |
| 2017/0286357 A1 | 10/2017 | Chellappan et al. | |
| 2020/0081646 A1 | 3/2020 | Byun et al. | |
| 2020/0082891 A1 | 3/2020 | Lee et al. | |
| 2020/0192856 A1 | 6/2020 | Lee et al. | |
| 2020/0356519 A1 | 11/2020 | Ballantyne et al. | |
| 2020/0379833 A1 | 12/2020 | Hsiao et al. | |
| 2022/0294476 A1 | 9/2022 | Seol et al. | |
| 2023/0056001 A1 | 2/2023 | Lin | |
| 2023/0188256 A1 | 6/2023 | Yu et al. | |
| 2023/0239073 A1* | 7/2023 | Bharadwaj | H04B 17/354 |
| | | | 714/726 |
| 2023/0377618 A1 | 11/2023 | Lin | |
| 2023/0396360 A1 | 12/2023 | Zhang et al. | |
| 2024/0014943 A1 | 1/2024 | Kuo et al. | |
| 2024/0121326 A1 | 4/2024 | Lin | |
| 2024/0397399 A1 | 11/2024 | Gupta et al. | |

* cited by examiner

METHOD FOR FACILITATING TESTING FOR AN INTERCONNECTION PROTOCOL, A CONTROLLER, AND AN ELECTRONIC DEVICE

CROSS-REFERENCE TO RELATED APPLICATION

This non-provisional application claims the benefit under 35 U.S.C. § 119(e) of U.S. Provisional Patent Application No. 63/415,166 filed on Oct. 11, 2022, and claims priority under 35 U.S.C. § 119(a) to Taiwanese Patent Application No. 112129561 filed on Aug. 7, 2023, in the Taiwan Intellectual Property Office, the entire contents of which are hereby incorporated by reference.

BACKGROUND OF THE INVENTION

1. Field of the Invention

The present disclosure relates to an electronic device and a method therefor, and in particular to methods for facilitating testing for an interconnection protocol capable of performing an advanced line encoding, a controller therefor, and an electronic device therefor such as a host device or a storage device.

2. Description of the Related Art

The Mobile Industry Processor Interface (MIPI) alliance developed interconnection protocol technology, for example, MIPI M-PHY specification associated with a physical layer and MIPI UniPro specification associated with a Unified Protocol (UniPro), for interconnection from one chip to another inside the mobile devices or those affected by the mobile devices in order to implement higher transmission speeds and low power consumption operations. On the other hand, the Joint Electron Device Engineering Council (JEDEC), using the MIPI M-PHY specification and the MIPI UniPro specification, launched a high-performance non-volatile memory standard that is referred to as Universal Flash Storage (UFS). The UFS standard realizes gigabit-level high-speed transmissions and low-power operations, and provides the functionality and expandability required for advanced mobile systems (for example, computing devices such as smartphones, tablet computers, multimedia devices, and wearable devices) to facilitate rapid adoption by the industry.

A system implemented according to the UFS standard includes a local host and a remote device, wherein the local host may be a computing device and the remote device may be a storage device implemented by a non-volatile memory, for example. A bidirectional link is established between the host and the device, and this link in between can be configured with multiple lanes in either of the transmission directions. Each of the host and the device can be implemented with a physical interface according to the M-PHY specification and a link controller according to the UniPro specification.

For all M-PHY symbols transmitted over the link, the physical interface is required to apply a specified line coding (or symbol coding) technique referred to as "8b10b" or "8b/10b" coding defined in the M-PHY specification for DC balance. The link controller also utilizes the symbol encoding technique that UniPro requires for M-PHY correspondingly. In this well-known 8b10b coding scheme, every byte is converted to ten bits and the 8b10b coding has 20% overhead accordingly.

BRIEF SUMMARY OF THE INVENTION

In the present disclosure, technologies for facilitating an interconnection protocol capable of performing a line coding scheme having an improved effective data rate are provided, and are suitable for an electronic device capable of communicating with another electronic device according to the interconnection protocol.

Embodiments of a method for facilitating testing for an interconnection protocol are provided, suitable for an electronic device capable of communicating with another electronic device. The method comprises the following steps. At a controller of the electronic device, a test mode request signal is received to enter a test mode in which data transmission is to be performed by using an advanced line encoding having an improved effective data rate as compared to 8b/10b encoding. At the controller, a test data signal is generated to indicate a test pattern including an ordered set portion and a data pattern portion by using the advanced line encoding. The test pattern according to the advanced line encoding is transmitted through the electronic device to the other electronic device.

Embodiments of a controller suitable for an electronic device operable to communicate with another electronic device are provided. The controller comprises a hardware protocol engine and an interface circuit. The hardware protocol engine is capable of entering a test mode in which data transmission is to be performed by using an advanced line encoding having an improved effective data rate as compared to 8b/10b encoding and the controller is capable of generating a test pattern including an ordered set portion and a data pattern portion. The interface circuit is capable of transmitting the test pattern according to the advanced line encoding in the test mode to the other electronic device.

Embodiments of an electronic device, operable to communicate with another electronic device, are provided. The electronic device comprises a processing unit and a controller. The controller, coupled to the processing unit, is capable of entering a test mode in which data transmission is to be performed by using an advanced line encoding having an improved effective data rate as compared to 8b/10b encoding and the controller is capable of generating a test pattern including an ordered set portion and a data pattern portion, wherein the controller is capable of transmitting the test pattern according to the advanced line encoding in the test mode to the other electronic device.

In some embodiments of the method, the controller, or the electronic device, wherein the ordered set portion includes a first ordered set pattern and the data pattern portion includes a first data pattern, and the first ordered set pattern is transmitted for symbol alignment before the first data pattern is transmitted.

In some embodiments of the method, the controller, or the electronic device, the ordered set portion further includes a second ordered set pattern and the data pattern portion further includes a second data pattern, wherein the second ordered set pattern and the second data pattern are transmitted after the first ordered set pattern and the first data pattern are transmitted, and the second ordered set pattern is transmitted for symbol alignment before the second data pattern is transmitted.

In some embodiments of the method, the controller, or the electronic device, the first ordered set pattern includes a first ordered set and a second ordered set, wherein the first ordered set is transmitted for symbol alignment before the second ordered set is transmitted for scrambling seed reset for the first data pattern.

In some embodiments of the method, the controller, or the electronic device, in the test mode, before being transmitted, the data pattern portion is scrambled and the ordered set portion is not scrambled.

DETAILED DESCRIPTION OF THE INVENTION

Figure 1:
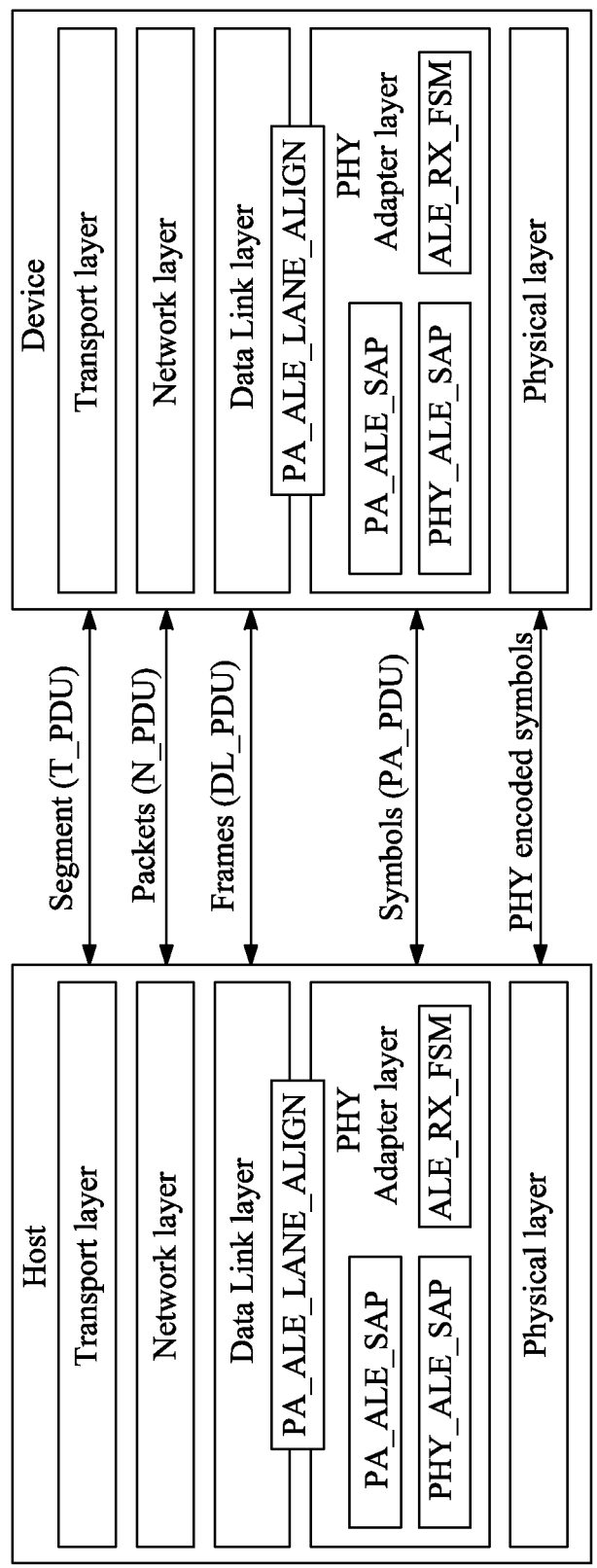
FIG. 1 is a schematic diagram illustrating new service access points (SAPs) in a modified UFS system to implement an advanced line encoding (ALE) according to an embodiment of the present disclosure.

To facilitate understanding of the object, characteristics and effects of this present disclosure, embodiments together with the attached drawings for the detailed description of the present disclosure are provided.

In the present disclosure, the inventor proposes an interconnection protocol with an advanced line coding scheme. The advanced line coding scheme hereafter is referred to as Advance Line Encode or advanced line encoding (ALE) which indicates a line coding scheme having an improved effective data rate as compared to 8b/10b coding scheme. For example, line coding schemes such as a 128b/129b, 128b/130b, 128b/132b, 256b/257b, or 256b/258b coding scheme, or so on, have reduced overhead, as compared to 8b/10b coding scheme, and thus have improved effective data rates as compared to 8b/10b coding scheme. As an example, in a 128b/130b coding scheme, every 128-bit payload data is converted to 130-bit "block" to be transmitted and the 128b/130b coding has 1.54% overhead and an effective data rate of 98.46% accordingly. Likewise, in other examples, 128b/129b, 128b/132b, 256b/257b, or 256b/258b coding scheme or so on can be implemented as an advanced line encoding scheme.

The interconnection protocol can be derived from the UFS standard. The interconnection protocol can also be regarded as a proposed or enhanced version of the UFS standard in the future. The advanced line coding can be implemented in the interconnection protocol as an advanced operation mode, or referred to as an advanced line encoding (ALE) mode, which indicates that an electronic device compliant with the interconnection protocol is capable of data transmission by using an advanced line encoding scheme.

In the present disclosure, testing operations in the advanced line encoding mode are concerned. Embodiments of physical layer test mode operations which are obtained by modification of the current UniPro specification are provided below to facilitate implementation of enhanced line coding scheme. The DL frame re-transmission operations can also be adopted in further derivations of the interconnection protocol.

In order to facilitate testing operations in the advanced line encoding mode of the proposed interconnection protocol, symbol alignment and symbol lock issues are addressed with examples in the present disclosure.

In the advanced line encoding mode, a signaling scheme for transmission of bits different from conventional signaling schemes (such as Non-Return-to-Zero (NRZ) or Pulse Width Modulation (PWM)) available in the current UFS standard, may be further adopted in conjunction with the advanced line encoding scheme to enhance overall data throughput. For example, signaling schemes for bits transmission such as pulse amplitude modulation (PAM) n-level (PAM-n) can be adopted together with the advanced line encoding scheme, wherein n is an integer such as 3, 4, 5, 6, 8, or 16. The embodiments of DL Frame replay operations which are obtained by modification of the current UniPro specification can also facilitate implementation of an advanced line encoding scheme in conjunction with the signaling scheme such as PAM-4 or so on.

Various embodiments are provided below for facilitating the interconnection protocol based on the ALE, and are suitable for an electronic device capable of communicating with another electronic device according to the interconnection protocol.

As mentioned above, the interconnection protocol with the ALE can be derived from the UFS standard. For example, a conventional UFS system includes a UFS host and a UFS device. The UFS host and the UFS device communicate each other through respective UFS Interconnect (UIC) layer including UniPro and M-PHY. Accordingly, the interconnection protocol with the ALE can be implemented and derived from architecture of the conventional UFS system by using a modified UFS system implementing a modified version of UniPro and a modified version of M-PHY for the ALE. Further, the interconnection protocol with the ALE can also be implemented in a communication system including a host and a device each having respective link layer (such as a modified version of UniPro) and respective physical layer (such as a modified version of M-PHY) both compliant with the ALE.

Referring to FIG. 1, service access points (SAPs) in a modified UFS system are illustrated to implement an advanced line encoding (ALE) according to an embodiment of the present disclosure. In this embodiment as shown in FIG. 1, either the host or device of the modified UFS system has new service access points (SAPs) associated with the facilitation of ALE in the protocol stack. For example, a PHY Adapter (PA) service access point for ALE, denoted by PA_ALE_SAP, provides services in the PA layer for data transfer for ALE. In addition, a service access point for PHY layer (e.g., M-PHY) with ALE, denoted by PHY_ALE_SAP, provides services in the PA layer for association of the PA layer with PHY layer. A PA service access point for lane alignment for ALE, denoted by PA_ALE_LANE_ALIGN, provides services in the PA layer and to DL layer for lane alignment. Further, a finite state machine (FSM) for a receiver to support operations in the advanced line encoding mode, denoted by ALE_RX_FSM, is provided in the PA layer as shown in FIG. 1, for example.

As illustrated in FIG. 1, on one side (e.g., a host) of the communication system, the layers of the UniPro, such as the transport layer to PA layer, and the PHY layer communicate with their counterparts on the peer side (e.g., a device) by using their respective protocol data units (e.g., segments (T_PDU), packets (N_PDU), frames (DL_PDU), symbols (PA_PDU), and PHY encoded symbols), wherein the PA layer and PHY layer are configured to support the ALE. To implement an advanced line encoding, one or more blocks are generated in the PA layer for transmission to a peer side, wherein each block includes a plurality of symbols or protocol data units (PDUs) from the DL or PA layer. In this regard, the SAPs for data transfer or related operations in the advanced line encoding mode are provided in the modified UFS system.

Figure 2:
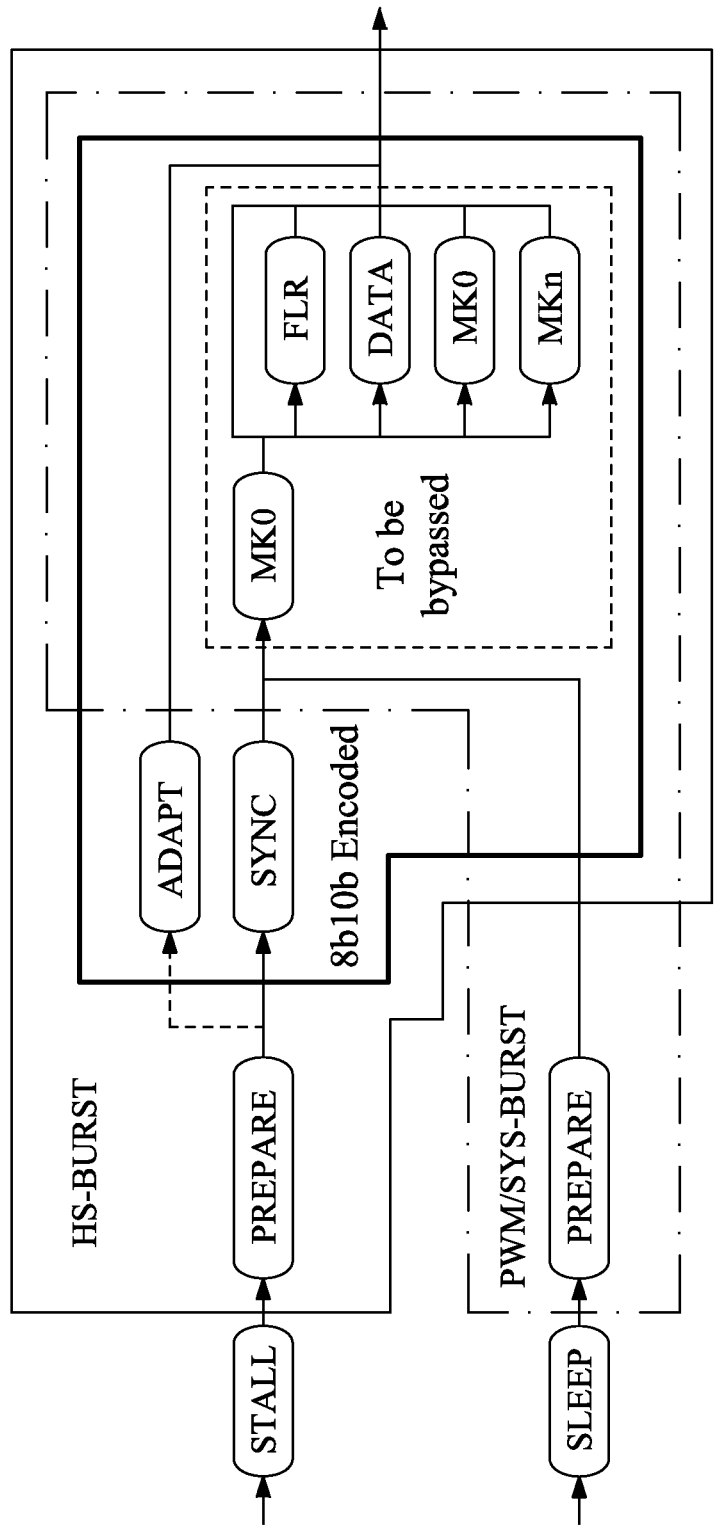
FIG. 2 is a schematic diagram illustrating modifications to M-PHY to facilitate data transmission using ALE according to an embodiment of the present disclosure.

In addition, FIG. 2 illustrates modifications to M-PHY to facilitate data transmission using ALE according to an embodiment of the present disclosure. Referring to FIG. 2, it is assumed that 8b/10b coding in M-PHY can be bypassed in a physical layer for the ALE derived from the current M-PHY, wherein the physical layer for the ALE is referred to as a modified physical layer or a modified M-PHY. In some embodiments, the modified physical layer is implemented as an interface circuit to perform transmission of bits of the "blocks" as mentioned above from the modified PA layer in the advanced line encoding mode in which 8b/10b coding is bypassed. In this manner, the modified physical layer in the advanced line encoding mode can be configured to perform bits transmission for the blocks and the advanced line encoding in which the blocks are encoded is performed in the modified PA layer. This approach leads to flexibility of implementation of the PA layer and the physical layer of the interconnection protocol in terms of line coding scheme. For example, the modified M-PHY may be implemented to perform bits transmission in the advanced line encoding mode in addition to conventional 8b/10b coding or implemented to be dedicated for the ALE instead of 8b/10b coding. For example, the modified M-PHY may be implemented to perform bits transmission using a specific signaling scheme, such as PAM-n (e.g., PAM-4), which can be utilized in the advanced line encoding mode. For example, in an implementation of the modified M-PHY, the interface between the modified PA layer and the modified physical layer may be an advanced line encoding interface with a larger bus width, e.g., a bus width of 80 bits or more, instead of a 64-bit Reference M-PHY MODULE Interface (RMMI). In addition, FIG. 2 illustrates a BURST sub-state machine specified by M-PHY specification (such as version 5.0), wherein the terms such as STALL, PREPARE, ADAPT, SYNC, SLEEP, PREPARE, HS-BURST, PWM/SYS BURST, and so on are defined by the M-PHY specification, which one of ordinary skill in the art would understand accordingly, and for the sake of brevity, their details will not be repeated herein.

Figure 3:
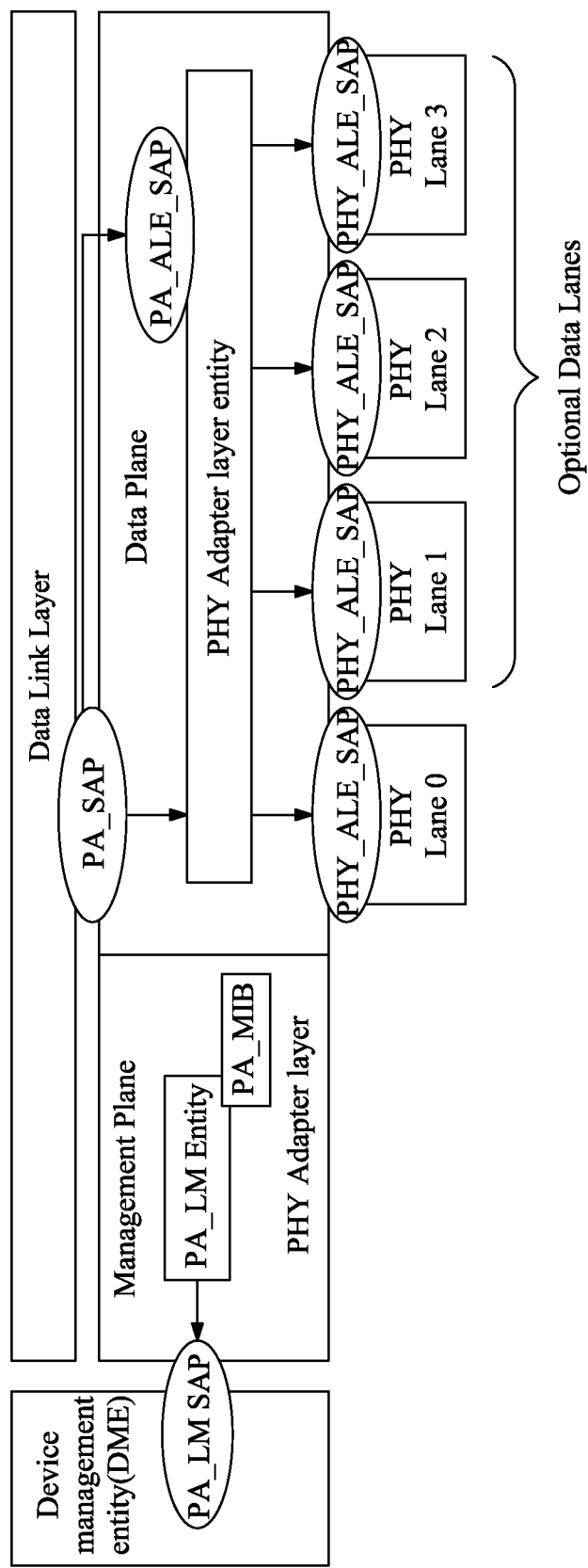
FIG. 3 is a schematic diagram of an embodiment of PHY adapter layer SAP model for ALE operations.

FIG. 3 illustrates an embodiment of PHY adapter layer SAP model for ALE operations in a schematic diagram. A modified PHY adapter (PA) layer illustrated in FIG. 3 for ALE can be derived from the PHY Adapter Layer SAP model of UniPro version 2.0. As shown in FIG. 3, a data link layer, a PHY Adapter layer, and a device management entity (DME) can be derived from the PHY Adapter Layer SAP model of UniPro version 2.0. The PHY Adapter layer, for example, includes PA_SAP and PHY Adapter layer entity in data plane; and PA layer management (PA_LM) entity, PA Layer-specific Management Information Base (PA_MIB), and PA layer management service access point (PA_LM SAP) in management plane. As compared to the PA layer of UniPro version 2.0, the modified PA layer has the PHY Adapter (PA) service access point for ALE (PA_ALE_SAP) in the modified PA layer to provide services in the modified PA layer, especially for the PHY Adapter service access point (PA_SAP). In addition, the service access point for PHY layer with ALE (PHY_ALE_SAP) provides services to the modified PA layer, for example, the PHY Adapter layer entity. The modified PA Layer is associated with at least one PHY entity via its PHY_ALE_SAP, wherein there may be one or more PHY entities corresponding to data lanes, denoted by PHY Lane 0 to PHY Lane 3, and PHY Lane 1 to PHY Lane 3 are optional. In this manner, the implementations of the modified PA layer and modified M-PHY with respect to the ALE are hidden from the data link layer. Thus, the PHY adapter layer SAP model for ALE facilitates the implementation of the interconnection protocol with the ALE and reduces its implementation complexity.

For implementations of the interconnection protocol, PA_ALE_SAP, PHY_ALE_SAP, PA_ALE_LANE_ALIGN, and ALE_RX_FSM, as previously mentioned in relative to FIG. 1 or 3, are exemplified in the following embodiments.

In some embodiments as follows, the PHY Adapter (PA) service access point for ALE, or PA_ALE_SAP, includes a plurality of service primitives for data transfer.

In an embodiment of the service access point PA_ALE_SAP, a service primitive for data transfer (or referred to as a data transfer primitive or a primitive), denoted by PA_ALE_ESCDATA.req, is provided. The PA_ALE_ESCDATA.req primitive is used to request the transmission of ALE escaped payload data. The ALE escaped payload data indicates the escaped payload data to be transmitted by communication using an ALE scheme. The semantics of this primitive are: PA_ALE_ESCDATA.req(ALE_EscType, ALE_EscParam), wherein an ALE_EscType parameter specifies escaped data type and the corresponding escaped payload data is given with an EscParam parameter, as exemplified in TABLES 1 and 2 below. The PA_ALE_ESCDATA.req primitive is generated, for example, when a PA Layer ALE escaped data symbol (i.e., ALE escaped payload data) is to be transmitted over a link, wherein the link is a bidirectional interconnection between two devices (e.g., a host and a device). On receipt of the PA_ALE_ESCDATA.req primitive, the PA Layer transfers information associated with the ALE_EscType and ALE_EscParam parameters over the link via the underlying physical layer.

TABLE 1 illustrates examples of the primitive parameters for PA_ALE_SAP.

TABLE 1

| Name | Type | Valid Range | Description |
| --- | --- | --- | --- |
| ALE_Data | Integer | 0 to 65535 | Normal payload data |
| ALE_EscType | Enumeration | ESC_ALE | Escaped data type (See below) |
| ALE_EscParam | Integer | 0 to 127 | Escaped payload data |

TABLE 2 illustrates examples of the parameters ALE_EscType and ALE_EscParam for ALE.

TABLE 2

| ALE_EscType | T | ALE_EscParam | | | | | | | POS | CRC-5 |
| --- | --- | --- | --- | --- | --- | --- | --- | --- | --- | --- |
| | bit 15 | bit 14 | bit 13 | bit 12 | bit 11 | bit 10 | bit 9 | bit 8 | bit 7:5 | Bit 4:0 |
| SOF | 2'b00 | | | 0 | Rsvd | Rsvd | TC | | | |
| AFC | 2'b00 | | | 1 | Rsvd | CReq | TC | | | |
| COF | 2'b01 | | | 2'b00 | | Rsvd | TC | | | |
| NAC | 2'b01 | | | 2'b01 | | RReq | Rsvd | Rsvd | | |
| <FLR, FLR> | 2'b01 | | | 4'b1000 | | | | Rsvd | | |
| <MK4, MK4> | 2'b01 | | | 4'b1001 | | | | Rsvd | | |
| <MK2, FLR> | 2'b01 | | | 4'b1010 | | | | Rsvd | | |
| <MK2, MK2> | 2'b01 | | | 4'b1011 | | | | Rsvd | | |
| Reserved | 2'b01 | | | 4'b1100 | | | | Rsvd | | |
| Reserved | 2'b01 | | | 4'b1101 | | | | Rsvd | | |
| Reserved | 2'b01 | | | 4'b1110 | | | | Rsvd | | |
| PACP | 2'b01 | | | 4'b1111 | | | | Rsvd | | |
| EOF_EVEN | 2'b10 | | | Frame Sequence Number | | | | | | |
| EOF_ODD | 2'b11 | | | Frame Sequence Number | | | | | | |

As illustrated in TABLE 2, the control symbol types (or escaped data type), denoted by ALE_EscType, of a frame structure for the ALE may have specific values corresponding to escaped parameters (denoted by ALE_EscParam) of the control symbol (or control PDU) for the ALE. The control symbol types, such as Start of Frame (SOF), Acknowledgment and Flow Control (AFC), Continuation of Preempted Frame (COF), Negative Acknowledgment Control (NAC), <FLR, FLR>, <MK4, MK4>, <MK2, FLR>, <MK2, MK2>, Physical Adapter Control Protocol (PACP), End of Frame with even number of bytes (EOF_EVEN), and End of Frame with odd number of bytes (EOF_ODD) are listed and provided with corresponding values in TABLE 2, wherein FLR stands for Filler and MK2 and MK4 stand for control symbols Marker2 and Marker4 respectively. In TABLE 2, TC stands for traffic class, CReq stands for credit transmit request, RReq stands for reset link request, and frame sequence number is used with each data frame, as they can be derived from or implemented according to the conventional UniPro specification or further implemented with additional or different functionality. Some fields are reserved (denoted by Rsvd).

In addition, as compared to the 8b/10b coding scheme used in the conventional UniPro and M-PHY specifications, it is not necessary for an implementation of the advanced line encoding with data scrambling to use the conventional UniPro IDLE symbol encoding. M-PHY symbol pairs <MK3, FLR>, <MK3, DAT>, <DAT, FLR> are also not used in the implementation of the advanced line encoding.

In an embodiment of the service access point PA_ALE_SAP, a service primitive for data transfer, denoted by PA_ALE_ESCDATA.ind, is further provided. The PA_ALE_ESCDATA.ind primitive is used to report the reception of a PA layer ALE escaped payload data symbol. The semantics of this primitive are: PA_ALE_ESCDATA.ind (ALE_EscType, ALE_EscParam), wherein an ALE_EscType parameter specifies escaped data type and the corresponding escaped payload data is given with an EscParam parameter, as exemplified in TABLES 1 and 2 above. The PA_ALE_ESCDATA.ind primitive is generated, for example, when a PA Layer ALE escaped data symbol is received over the link via the underlying physical layer. On receipt of the PA_ALE_ESCDATA.ind primitive, the PA Layer consumes the information associated with the ALE_EscType and ALE_EscParam parameters.

In an embodiment of the service access point PA_ALE_SAP, a service primitive for data transfer, denoted by PA_ALE_DATA.req, is provided. The PA_ALE_DATA.req primitive is used to requests the transmission of payload data. The semantics of this primitive are: PA_ALE_DATA.req(ALE_Data), wherein an ALE_DATA parameter specifies payload data, as exemplified in TABLE 1 above. The PA_ALE_DATA.req primitive is generated, for example, when a PA Layer ALE data symbol (i.e., the payload data) is to be transmitted received over the link. On receipt of the PA_ALE_DATA.req primitive, the PA Layer transfers the payload data over the link via the underlying physical layer.

In an embodiment of the service access point PA_ALE_SAP, a service primitive for data transfer, denoted by PA_ALE_DATA.ind, is further provided. The PA_ALE_DATA.ind primitive is used to report the reception of a PA layer ALE data symbol over the link. The semantics of this primitive are: PA_ALE_DATA.ind(ALE_Data), wherein an ALE_Data parameter specifies payload data, as exemplified in TABLE 1 above. The PA_ALE_DATA.ind primitive is generated, for example, when a PA Layer ALE data symbol is received over the link via the underlying physical layer. On receipt of the PA_ALE_DATA.ind primitive, the PA Layer consumes the payload data.

Further, as illustrated in FIG. 3, the PA Layer is associated with each PHY entity, which corresponding to a data lane, via its PHY_ALE_SAP. In order to facilitate an advanced line encoding adopted in the interconnection protocol, one or more ALE blocks are generated and processed in the PA layer of the interconnection protocol for transmission to a peer side.

In some embodiments, the service access point PHY_ALE_SAP is implemented to perform block management for data transfer based on an ALE. The following provides examples of the service access points PHY_ALE_SAP.

Regarding the service access point PHY_ALE_SAP, the block management can be implemented to perform ALE data block generation and ALE control block generation. In the modified M-PHY for the ALE, a unit of information for data transmission according to the ALE may be a data block (or called ALE data block) or a control block (or called ALE control block), which is generated according to an ALE block. An ALE block (or called a PDU block) includes a specific number of PDUs from the PA_ALE_SAP, such as one or more of control information (denoted by CTRL_INFO) PDU or data PDU. The specific number of PDU of the ALE block depends on the type of the ALE coding scheme to be adopted. For example, if a 128b/130b or 128b/132b coding scheme is adopted, one ALE block includes 8 PDUs (128 bits). In another example of using a 256b/257b or 256b/258b coding scheme, one ALE block includes 16 PDUs (256 bits). In a further example of using a 512b/514b or 512b/516b coding scheme, one ALE block includes 32 PDUs (512 bits).

Figure 4A:
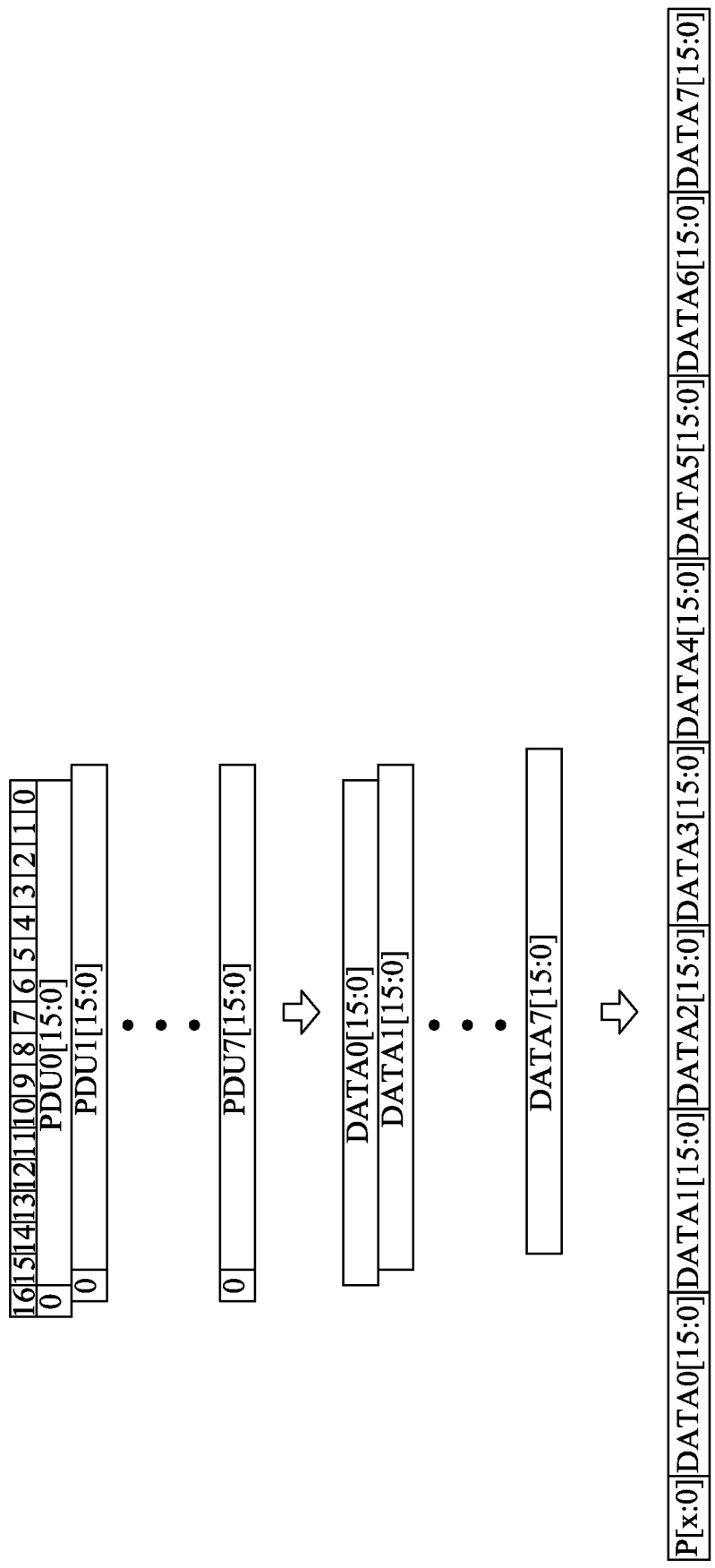
FIG. 4A is a schematic diagram illustrating an example of ALE data block generation.

In an embodiment, PHY_ALE_SAP can be implemented to perform ALE data block generation. An ALE data block includes synchronization header (denoted by SyncHdr) bits (or called preamble bits) and a specific number of the data PDUs (e.g., 8 PDUs). The format of an ALE data block can be represented by {SyncHdr bits, PDU×8}. FIG. 4A illustrates an example of ALE data block generation in a schematic diagram. The PHY_ALE_SAP can be implemented to receive a plurality of data PDUs, for example, denoted by DATA0[15:0], DATA1[15:0], DATA7[15:0] as shown on the middle portion of FIG. 4A, from the PA_ALE_SAP. For example, the PA_ALE_SAP directly maps a number of DL data PDUs, for example, denoted by PDU0[15:0], PDU1[15:0], . . . , PDU7[15:0] as shown on the upper portion of FIG. 4A into the data PDUs (e.g., DATA0[15:0] to DATA7[15:0]). The PHY_ALE_SAP can be implemented to generate an ALE data block by adding a synchronization header (e.g., denoted by P[x:0]) and assembling a specific number of the received data PDUs (e.g., 8 PDUs), as shown on the lower portion of FIG. 4A.

In the above or other examples, P[x:0] represents the SyncHdr bits, wherein x indicates an integer equal to or greater than zero. In the case of 128b/129b coding scheme, the size of SyncHdr bits is 1 (i.e., x=0). In the case of 128b/130b coding scheme, the size of SyncHdr bits is 2 (i.e., x=1). In the case of 128b/132b coding scheme, the size of SyncHdr bits is 4 (i.e., x=3). Further, in some examples, in case of 256b/257b coding scheme, 256b/258b coding scheme, or so on, the size of SyncHdr bit(s) can be set in similar manners as illustrated above for 128b/129b coding scheme, 128b/130b coding scheme, or so on, respectively, whenever appropriate.

Figure 4B:
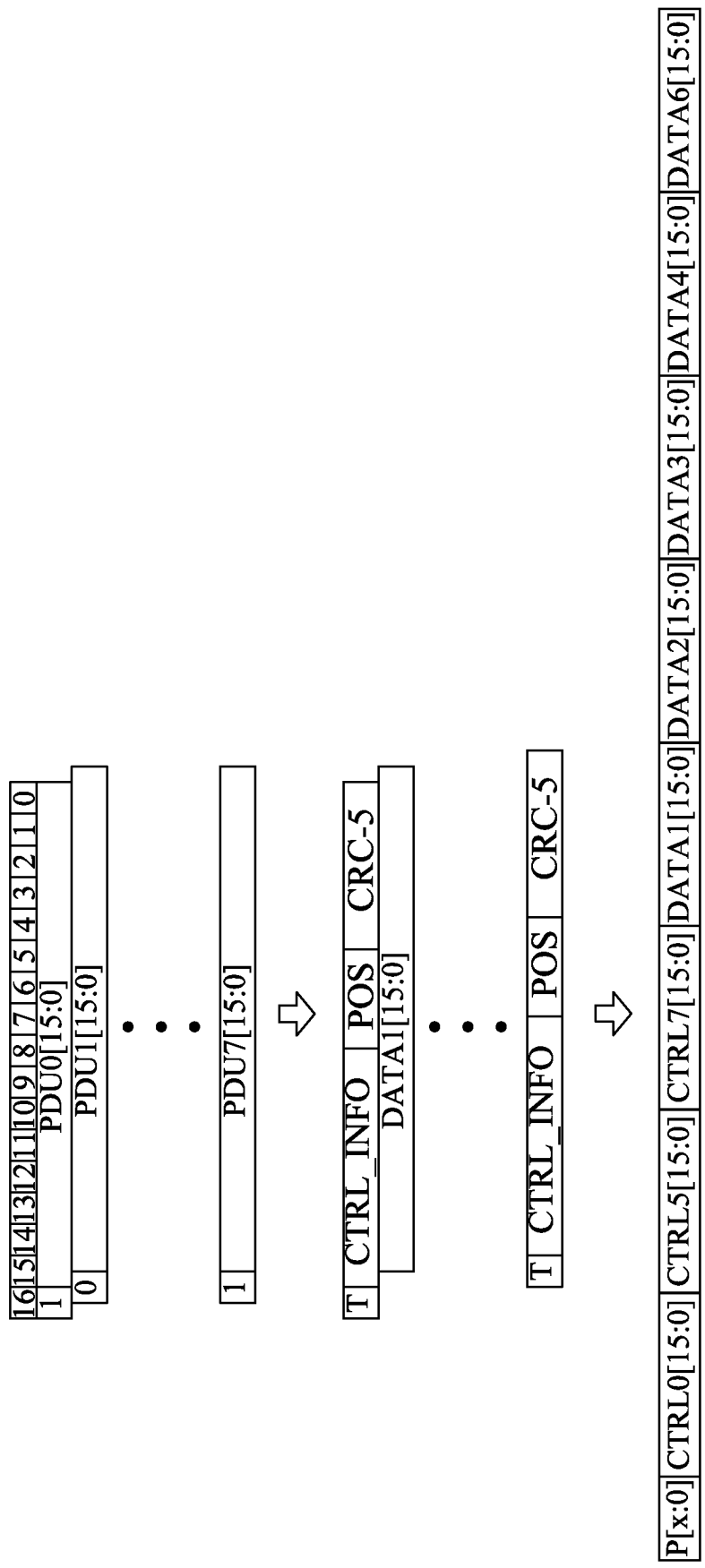
FIG. 4B is a schematic diagram illustrating an example of ALE control block generation.

In another embodiment, the PHY_ALE_SAP is implemented to perform ALE control block generation. An ALE control block includes synchronization header (denoted by SyncHdr) bits (or called preamble bits), at least one control information (CTRL_INFO) PDU (or simply referred to as control PDU), and may include one or more data information PDU (or simply referred to as data PDU), up to a specific number of PDUs (e.g., 8 PDUs). The format of an ALE control block, for example, is represented by {SyncHdr bit, CTRL_INFO PDUs, Data PDUs}. FIG. 4B illustrates an example of ALE control block generation in a schematic diagram. The PHY_ALE_SAP, for example, is implemented to receive a plurality of PDUs, which may include one or more CTRL_INFO PDUs and data PDUs as shown on the middle portion of FIG. 4B, from the PA_ALE_SAP. For example, the PA_ALE_SAP maps a number of PDUs from the DL layer or the PA layer into a number of PDUs for ALE. For example, the PDUs, denoted by PDU0[15:0], PDU1[15:0], PDU7[15:0], as shown on the upper portion of FIG. 4B, may include at least one ESC_DL related PDUs or ESC_PA related PDUs from the DL layer or the PA layer. The PDUs for ALE, as shown on the middle portion of FIG. 4B, may include CTRL_INFO PDUs and data PDUs. The PHY_ALE_SAP can be implemented to generate an ALE control block according to the PDUs for ALE by adding a synchronization header (e.g., denoted by P[x:0]) and assembling a specific number of the PDUs (e.g., 8 PDUs) including at least one control PDU, as shown on the lower portion of FIG. 4B. In the ALE control block, all of the CTRL_INFO PDUs are arranged in series after the synchronization header, as illustrated in FIG. 4B. In other words, the PHY_ALE_SAP can be implemented to be capable of reordering the PDUs for ALE to generate the ALE control block.

In FIG. 4B, a CTRL_INFO PDU, for example, may be originated from the DL or PA layer and includes control information (CTRL_INFO), a T tag, and a position (POS) field. The control information indicates ALE_EscParam, as exemplified in TABLE 2. The T tag (or referred to as a link list field) indicates a link list in a control block. The POS field indicates the position of DL_CTRL_INFO position in an ALE block. Each ALE block has a specific number of PDUs, such as 8 PDUs (128 bits). Optionally, the CTRL_INFO PDU can end with a cyclic redundancy check (CRC) field, such as a CRC-5 field indicating using CCITT-CRC5 to cover and protect fields from T, CTRL_INFO to POS in order to enhance reliability of transmission, wherein CCITT stands for International Telegraph and Telephone Consultative Committee.

In addition, the bit width of POS field is variable for different implementations of ALE. An ALE block indicates a group of a specific number of PDUs to be transmitted by communication according to an ALE and can be referred to a PDU block as well. In the above format as shown in FIG. 4B or TABLE 2, the bit width of the POS field is 3 bits for an implementation of ALE with an ALE block of 8 PDUs (or referred to as 8-PDU ALE block). In case of a 16-PDU ALE block, its POS field can be 4 bits wide and CRC-5 field will no longer be used. In theorem, a POS field of 8 bits can be used in implementations of ALE with an ALE block of up to 256 PDUs. In addition, in the stage of the PDU mapping associated with PA_ALE_SAP, the value of a link list field (T tag) or a POS field with respect to a control information PDU (such as DL_CTRL_INFO or PA_CTRL_INFO PDU) may be set to a default value (e.g., 0 or another value) temporarily. The value of the link list field (T tag) or the POS field with respect to the control information PDU is to be determined in the stage of generation of a control block by the PHY_ALE_SAP.

As illustrated above, the DL frames or PACP frames on the sending side, such as a host (or a device), are translated into ALE control blocks or data blocks in the PA layer. The modified M-PHY for the ALE is implemented to transmit the ALE control blocks or data blocks to a receiving side (or called receiver side), such as a device (or a host).

On the receiving side, a modified version of UniPro can be implemented to restore the PDUs of an ALE control block to its former ordering by checking the POS fields of the control symbols of the ALE control block. An embodiment of a process for restoring operations is as follows. First, finding a synchronization header of a control block is performed, wherein the control block has at least one CTRL_INFO PDU. Secondly, a control symbol, e.g., CTRL_INFO PDU, from the first PDU after the synchronization header is extracted. The T tag of the control symbol is then examined. If T=0, extraction of the followed CTRL_INFO PDU on the next PDU is performed. If T=1, extraction of the followed data PDU on the next PDU is performed. Restoring CTRL_INFO PDUs is performed after the examination of the last PDU.

In addition, on the sending side, the ALE control blocks or data blocks are scrambled before being transmitted by the modified M-PHY for DC balance, and on the receiving side, corresponding received data is de-scrambled before the restoring operations. The scrambling or de-scrambling operation can be implemented in the PA layer or physical layer of the interconnection protocol, for example.

In the advanced line encoding scheme, there is no K-Code (control symbols) of 8b/10b coding scheme for the receiver to do symbol alignment and symbol lock operation. In order to resolve symbol alignment and symbol lock issue in the ALE coding scheme, an ALE control block is generated on the transmitter side as illustrated above by reordering control symbols to be transmitted for symbol alignment and symbol lock and the ALE control block can then be restored on the receiver side accordingly.

In an embodiment, the PA service access point for lane alignment for ALE, PA_ALE_LANE_ALIGN, is provided. The service access point PA_ALE_LANE_ALIGN is provided for the DL layer to send a lane alignment pattern in the advanced line encoding mode for the counterpart of a peer side to do block alignment and lock operation. For example, the lane alignment pattern includes an ordered set pattern provided for lane alignment in the ALE mode. As an example, the ordered set pattern has a format as follows: {Preamble bit, {8{8'h00}}, {8{8'hFF}}}+{Preamble bit, {4{8'hB1, {3{8'hC6}}}}}. The first ordered set of the ordered set pattern, i.e., {Preamble bit, {8{8'h00}}, {8{8'hFF}}}, is a low frequency pattern that alternates between 32 '0's and 32 '1's and is not involved in scrambling. The PA receiver, for example, is implemented to use the first ordered set of the ordered set pattern for block alignment. The second ordered set of the ordered set pattern, i.e., {Preamble bit, {4{8'hB1, {3{8'hC6}}}}}, is a special pattern which is not involved in scrambling. The PA receiver, for example, is implemented to determine whether the second ordered set of the ordered set pattern is properly received when a criterion with respect to the second ordered set is satisfied. In an example, where the second ordered set of the ordered set pattern has N (e.g., N=4) sets of a specific data pattern {8'hB1, {3{8'hC6}}} (i.e., {B1, C6, C6, C6}), a criterion may be made for the PA receiver as to whether there are M (e.g., M<N, such as M=3) or more than M sets of {B1, C6, C6, C6} are detected at the PA receiver. If the PA receiver using this criterion has detected M or more than M sets of {B1, C6, C6, C6}, the PA receiver determine that that the second ordered set of the ordered set pattern is properly received.

Figure 5:
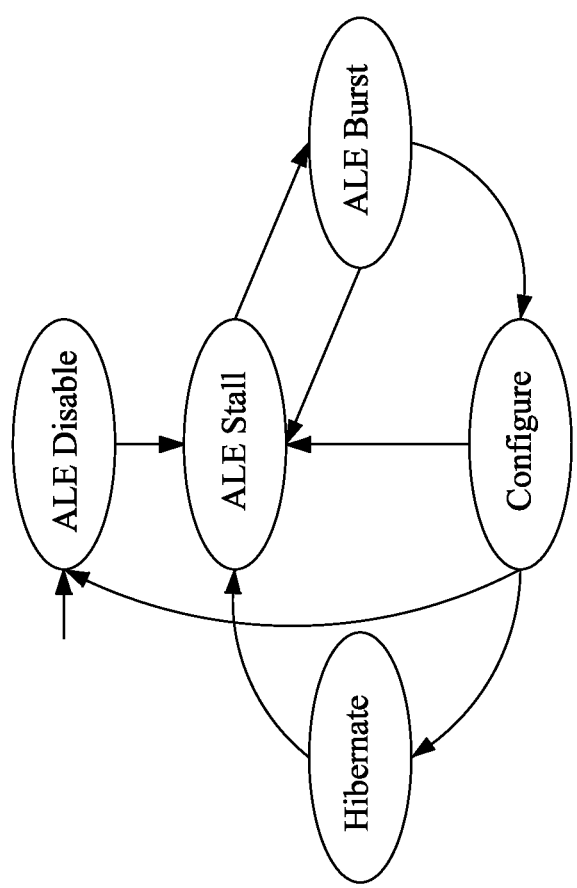
FIG. 5 is a diagram illustrating an example of a finite state machine for a receiving side.

In some embodiments, the PA layer of the interconnection protocol is implemented to operate according to a finite state machine (FSM), denoted by ALE_RX_FSM, for a receiver to support operations in the advanced line encoding mode. FIG. 5 illustrates an example of a finite state machine for a receiving side. The finite state machine ALE_RX_FSM can be implemented based on FIG. 5 and in a PA layer receiver. As shown in FIG. 5, the finite state machine includes a plurality of states (or referred to as ALE RX states) for a receiver to support operations in the advanced line encoding mode, including ALE Disable, ALE Stall, ALE Burst, Configure, and Hibernate.

TABLE 3 illustrates examples of the ALE RX states for ALE_RX_FSM. In TABLE 3, ALE RX states, such as ALE Disable, ALE Stall, ALE Burst, Configure, and Hibernate, have respective link width settings, link speed settings, and receiver operations.

TABLE 3

| ALE RX states | Link width | Link speed | Receiver error |
|---|---|---|---|
| ALE Disable | High-Speed mode (HS-mode) (8b/10b) | HS-mode | HS-mode error |
| ALE RX states | Link width | Link speed | Receiver error |
| ALE Stall | To be set | Transition | No action |
| ALE Burst | No action | ALE mode (128b/13xb) | ALE link error |
| Configure | No action | ALE mode | ALE link error |
| Hibernate | Undefined (Not available) | Undefined (Not available) | No action |

In some embodiments, when a PA layer receiver for the interconnection protocol is implemented according to FIG. 5, the PA layer receiver is operable to enter the advanced line encoding mode for data transfer or PHY test mode. Data transmission using an advanced line encoding occurs in bursts associated with power saving states between bursts. In FIG. 5, when a request for resetting the DME and the UniPro stack, such a DME_RESET.req primitive, or a RX_LineReset signal which is asserted, is received, the ALE Disable state is entered. For example, when the PA layer receiver is configured to operate in the ALE Disable state, the advanced line encoding mode is disabled and the PA layer receiver may be configured in another state or operating mode, such as a High-Speed mode (HS-mode) using 8b/10b coding, specified in the M-PHY specification (e.g., M-PHY version 5.0). When a power mode change requirement for entering the advanced line encoding mode is received from an upper layer or a local or remote device management entity (DME), the PA layer receiver transitions to the ALE Stall state, wherein the power mode change requirement, for example, may be a PA_LM_PWR_MODE_CHANGED.ind primitive being similar to or derived from that described in the UniPro specification. When a confirmation of a PHY test mode entering request that a local DME requests (e.g., denoted by a DME_ALE_TEST_MODE.cnf_L(SUCCESS) primitive), is received, the PA layer receiver also transitions to the ALE Stall state. When an indication of a PHY test mode entering request that a remote DME requests (e.g., denoted by a DME_ALE_TEST_MODE.ind primitive) is received, the PA layer receiver also transitions to the ALE Stall state. The ALE Stall state is a power saving state in the advanced line encoding mode, in order to enable fast and efficient BURST cycles in the advanced line encoding mode. The ALE Stall state is exited to the ALE Burst state due to a burst start event, such as a burst rising signaling or burst start pattern received at the PA layer receiver. In other words, the ALE Burst state is entered when the PA layer receiver receives the burst rising event from the sending side. Entering the ALE Stall state can occur from the ALE Disable, ALE Burst, Configure, or Hibernate state. For example, the ALE Burst state is exited to the ALE Stall state due to a burst end event, such as a burst failing signaling or burst end pattern received at the PA layer receiver. In addition, the ALE Burst state is exited to the Configure state due to a power mode change request and confirmation thereof. For example, the PA layer receiver enters the Configure state after the PA layer receiver receives a DME_POWERMODE.req primitive and confirms this primitive with a DME_POWERMODE.cnf_L primitive, wherein the DME_POWERMODE.req and DME_POWERMODE.cnf_L primitives can be derived from those specified in the UniPro specification. The Configure state is exited to the ALE Stall state when an indicator for entering the ALE Stall state is received. Further, the Configure state is exited to the Hibernate state when an indicator for entering the Hibernate state is received, or to the ALE Disable state when a reset request for the UniPro stack from an upper layer is received. The Hibernate state is a power saving state where power consumption is lower than that in the ALE Stall state and configuration associated with the interconnection protocol is retained. The Hibernate state is exited to the ALE Stall state when an indicator for exiting the Hibernate state is received.

Further, in some embodiments, the PA layer of the interconnection protocol is implemented to support an ALE PHY test mode for testing the physical layer for ALE, in addition to the normal operating mode. In some embodiments, the ALE PHY test mode can be derived from the M-PHY test mode described in the current UniPro specification (e.g., UniPro version 2.0), with additional operations or parameters. For example, in the ALE PHY test mode, a PA layer sends test patterns in the advanced line encoding mode when an attribute PA_PHYTestControl is set to enable ALE test pattern selection. Examples of the attribute PA_PHYTestControl is shown in TABLE 4.

TABLE 4 illustrates examples of a modified version of the attribute PA_PHYTestControl, which can be used in the interconnection protocol with ALE. In TABLE 4, the attribute PA_PHYTestControl, has an additional bit (e.g., b6), denoted by ALETestPatternSelectEnable, for indicating whether ALE Test Pattern Selection is enabled, in addition to other bits such as b0 to b5 of the attribute with the same or similar usage as described in the current UniPro specification (e.g., Section 5.7.17 of UniPro version 2.0).

TABLE 4

| Attribute | Attribute ID | Description | Type |
| --- | --- | --- | --- |
| PA_PHYTestControl | 0x15C2 | PHY Test Feature control register<br>b0: ContBurst<br>b1: CfgReady<br>b2: LineReset<br>b3: TestPatternTransmit<br>b4: TestPatternSelect<br>b5: Adapt<br>b6: ALETestPatternSelectEnable | 7-bit word |

For example, the bits b6 and b4 can be used in combination to represent different mode-specific test pattern selections. In an example, the combination of the bits b6 and b4, denoted by {b6, b4}={0, p}, with the bit b6 set to 0 can be used to represent high-speed mode (HS-mode) test pattern selection, such as test patterns denoted by PACP_TEST_DATA_0, PACP_TEST_DATA_1, PACP_TEST_DATA_2 PACP_TEST_DATA_3, as described in the UniPro specification (e.g., UniPro version 2.0). In addition, p is 0 or 1 and can be used to indicate different mode-specific test patterns, for example, as described in the UniPro specification.

The combination of the bits b6 and b4, denoted by {b6, b4}={1, p}, with the bit b6 set to 1 can further be used to represent ALE-mode test pattern selection such as test patterns associated with PACP frames denoted by PACP_ALE_TEST_DATA_0, PACP_ALE_TEST_DATA_1, PACP_ALE_TEST_DATA_2, and PACP_ALE_TEST_DATA_3. For example, these ALE-mode test patterns are described in TABLE 5 and TABLE 6 for the combination {b6, b4}=1, 01 (i.e., p=0), wherein each data block (e.g., in a format of ALE data block) has payload data of a plurality of "PA symbols" such as 8 zero data PDUs (i.e., each PDU contains data of 0000h). For example, additional ALE-mode test patterns can be obtained for the combination {b6, b4}={1, 1} (i.e., p=1) in a manner similar to those described in TABLE 5 and TABLE 6 except that each data block (e.g., in a format of ALE data block) has payload data of a plurality of other "PA symbols" such as 8 data PDUs of data '1' or an all '1' sequence (i.e., each PDU contains data of FFFFh). Certainly, the implementation of the ALE-mode test patterns associated with the combination {b6, b4} is not limited to the examples and can be set in any appropriate manner. For example, these ALE-mode test patterns can also be configured to have each data block with payload data of a plurality of "PA symbols" (or a data sequence), such as 4 first data PDUs of 00h and 4 second data PDUs of FFh, 4 first data PDUs of FFh and 4 second data PDUs of 00h, or other arbitrary combinations of '0' and '1'.

TABLE 5 describes examples of the ALE-mode test patterns. In TABLE 5, the test patterns are denoted by ALE_COMP_x (e.g., x is 1, 2, 3, or 4) for each active lane and have 256×8 PDUs. In addition, in some examples, the advanced line encoding mode can be implemented in conjunction with a PAM-n (e.g., PAM-4, wherein n>2) signaling scheme, wherein CRC64 can be optionally used in the test patterns for better reliability for testing purposes.

TABLE 5

| Pattern | Active Lanes | PACP Frame | Payload | CRC-64 |
|---|---|---|---|---|
| ALE_COMP_1 | 1 | PACP_ALE_TEST_DATA_0 | 256 × 8 PDUs | CRC64 |
| ALE_COMP_2 | 2 | PACP_ALE_TEST_DATA_1 | 256 × 8 PDUs | CRC64 |
| ALE_COMP_3 | 3 | PACP_ALE_TEST_DATA_2 | 256 × 8 PDUs | CRC64 |
| ALE_COMP_4 | 4 | PACP_ALE_TEST_DATA_3 | 256 × 8 PDUs | CRC64 |

In an example, the test patterns ALE_COMP_x (e.g., x is 1, 2, 3, or 4) can be expressed in TABLE 6.

TABLE 6

ALE_COMP_x = {
  One SKP OS + SDS OS;
  One PACP_ALE_TEST_DATA_y;
  255 sets of {
    One SKP OS;
    One PACP_ALE_TEST_DATA_y
  }
}
wherein:
"x" represents 1, 2, 3, 4;
"y" represents 0, 1, 2, 3;
One PACP_ALE_TEST_DATA_y includes 256 Data Blocks and CRC-64, each Data Block having a payload of 8 zero data PDUs (0000h) and being scrambled.

In the example in TABLE 6, one ALE_COMP_x has 256 test loops, including a first test loop expressed by {SKP OS+SDS OS; PACP_ALE_TEST_DATA_y} and 255 sets of test loops each expressed by {SKP OS; PACP_ALE_TEST_DATA_y}, wherein one PACP_ALE_TEST_DATA_y includes 256 data blocks and CRC-64, and each data block has a payload of 8 data PDUs (e.g., each PDU set to 0000h) and being scrambled. The pair of ordered sets {SKP OS+SDS OS} (e.g., represented by PA_ALE_LANE_ALIGN) in the first test loop is used for UniPro to do symbol alignment and lock operation. The SKP OS in each of the second and subsequent test loops is used for bit shift alignment. In addition, each test data in the test loops is protected by a CRC-64. It is noted that PA_ALE_LANE_ALIGN or SKP OS is neither involved with scrambling nor CRC64 calculation.

After scrambling, all of the payloads of the data blocks such as zero data PDUs will become pseudo random data. The following provides an example of scrambling.

Data being transmitted in the test mode is scrambled with a pseudo-random-bit-stream (PRBS) to reduce the likelihood of repetitive pattern in the Link. Data scrambling is applied on a per-Lane base. In a multi-lane link, scrambling appears as independent between the Lanes. All active Lanes going into the same direction is scrambled. The PRBS is generated using the Galois form of a Linear Feedback Shift Register (LFSR) implementing a generator polynomial. For example, a generator polynomial for ALE PHY test mode can be expressed by:

$$G(X)=X^{23}+X^{21}+X^{16}+X^8+X^5+X^2+1.$$

The LFSR can be initialized dependent on the logical Lane number to the following 16-bit seed values, for example:

Logical Lane 0: seed=0x1D_BFBC;
Logical Lane 1: seed=0x06_07BB;
Logical Lane 2: seed=0x1E_C760; and
Logical Lane 3: seed=0x18_C0DB.

Scrambling can be achieved by bit-wise addition (X-OR) of a sequence of eight bits G(x) with the M-PHY data Symbol bit to be scrambled, starting from bit 0 up to bit 7 of the 8-bit M-PHY data symbol. Then, the scrambled values for respective logical lanes are as exemplified in TABLE 7.

TABLE 7

| LANE3 | LANE2 | LANE1 | LANE0 | Comments |
|---|---|---|---|---|
| 18C0DB | 1EC760 | 607BB | 1DBFBC | Initial SEED |
| 7C26 | 8C71 | F057 | 6CBD | Pseudo random data output |
| F000 | BC91 | 4C91 | 9498 | |
| A38E | EF2F | 4CA1 | 53C6 | |
| 1864 | B432 | AC56 | D8CE | |
| D741 | D50E | 024F | 506A | |
| BDA2 | FE30 | 4392 | 75C1 | |
| 30C2 | 6DFC | 5D3E | 044F | |
| 19A7 | 1526 | 0C81 | C307 | |
| 9FC9 | 8380 | 1C49 | 7526 | |
| E5C3 | 9839 | 7DFA | C606 | |
| 121D | CA9F | D882 | A3B0 | |
| B157 | 47D6 | F681 | B4AB | |
| 0738 | 9DD1 | 9AE9 | 0511 | |
| 3FE0 | FF23 | C0C3 | CC57 | |
| B725 | 7F20 | C805 | 4E69 | |
| 5215 | DEE9 | 8CFC | 4273 | |
| 59E5 | A43B | FDDE | 1D0F | |
| 85A0 | F176 | 74D6 | B703 | |
| 3D06 | 0C40 | 3146 | E045 | |
| 033F | 5FFD | 5CC2 | BASE | |
| ... | ... | ... | ... | |

From the values listed in TABLE 7, it can be seen that the scrambled values for respective lanes are pseudo random values. In this matter, test patterns as described in TABLE 6 also result in pseudo random bit streams when the test patterns are transmitted for testing. Other examples of test patterns can also be obtained by using those described in TABLE 6 and changing the payload of each data block to different data PDUs instead of zero data PDUs.

Further, in addition to the test patterns described in TABLE 6, any other test patterns can also be used in the ALE PHY test mode whenever appropriate.

In some embodiments, a test pattern for the ALE PHY test mode can be implemented to have a data structure including an ordered set portion and a data pattern portion. For example, the ordered set portion includes a first ordered set pattern (e.g., SKP OS+SDS OS) and the data pattern portion includes a first data pattern (e.g., PACP_ALE_TEST_DATA_y), and the first ordered set pattern is transmitted for symbol alignment before the first data pattern is transmitted.

For example, the ordered set portion further includes a second ordered set pattern (e.g., SKP OS) and the data pattern portion further includes a second data pattern (e.g., PACP_ALE_TEST_DATA_y), wherein the second ordered set pattern and the second data pattern are transmitted after the first ordered set pattern and the first data pattern are transmitted, and the second ordered set pattern is transmitted for symbol alignment before the second data pattern is transmitted.

For example, the first ordered set pattern includes a first ordered set (e.g., SKP OS) and a second ordered set (e.g., SDS OS), wherein the first ordered set is transmitted for symbol alignment before the second ordered set is transmitted for scrambling seed reset for the first data pattern. For example, at the receiving side, when the first ordered set pattern or the second ordered set is received, descrambling is reset with an associated scrambling seed adopted by both the transmitting side and receiving side, such as a seed exemplified in TABLE 7. In addition, before being transmitted over the link, the data pattern portion is scrambled and the ordered set portion is not scrambled.

In some embodiments, one or more test patterns may be obtained by using the above or similar data structure. For example, the test patterns as described in TABLE 6, with the ordered set pattern ({SKP OS+SDS OS}), SKP OS, or SDS OS modified or changed to other ones that are suitable for symbol or bit alignment and lock operation. In some embodiments, one or more test patterns may be obtained by using data structure as described in TABLE 6, with the number of the test loops in TABLE 6 set to another values; for example, 127, 300, 512, 768, 1024 or any arbitrary value. In some embodiments, one or more test patterns may be obtained by using data structure as described in TABLE 6, with a first data frame (instead of PACP_ALE_TEST_DATA_y) for the first test loop and a second data frame (instead of PACP_ALE_TEST_DATA_y) for the second test loop and so on, wherein the first and second data frames may include respective payload data, such as 128, 512, 768, 1024 data blocks, or any appropriate number of data blocks, wherein each data block may have the same or different payload. As such, it is noted that the implementation of the ALE PHY test mode is not restricted to the examples in the present disclosure. Any other test patterns for the ALE PHY test mode can also be used in the ALE PHY test mode whenever appropriate.

Further, it is noted that in the ALE test patterns as illustrated in TABLE 6, the purpose of the first ordered set pattern (e.g., SKP OS+SDS OS) in the first loop is Symbol Lock and scrambling seed reset (e.g., Scramble LFSR reset). In addition, it is used for Lane-to-Lane deskew as well. In addition, the purpose of the second ordered set pattern (e.g., SKP OS) in the second loop or subsequent loops is to do bit shift alignment; that is, doing symbol alignment to prevent occurrence of bit shifting. For example, a new opened burst for ALE test starts from the first loop test data. The first ordered set pattern {SKP OS+SDS OS} is required for scrambling LFSR reset and Lane-to-Lane de-skew. Certainly, symbol lock is performed as well. Further, within a burst, the second ordered set pattern {SKP OS} is sent for bit shift alignment.

Some embodiments for facilitating implementation of ALE PHY test mode in the advanced line encoding mode are provided below.

Figure 6A:
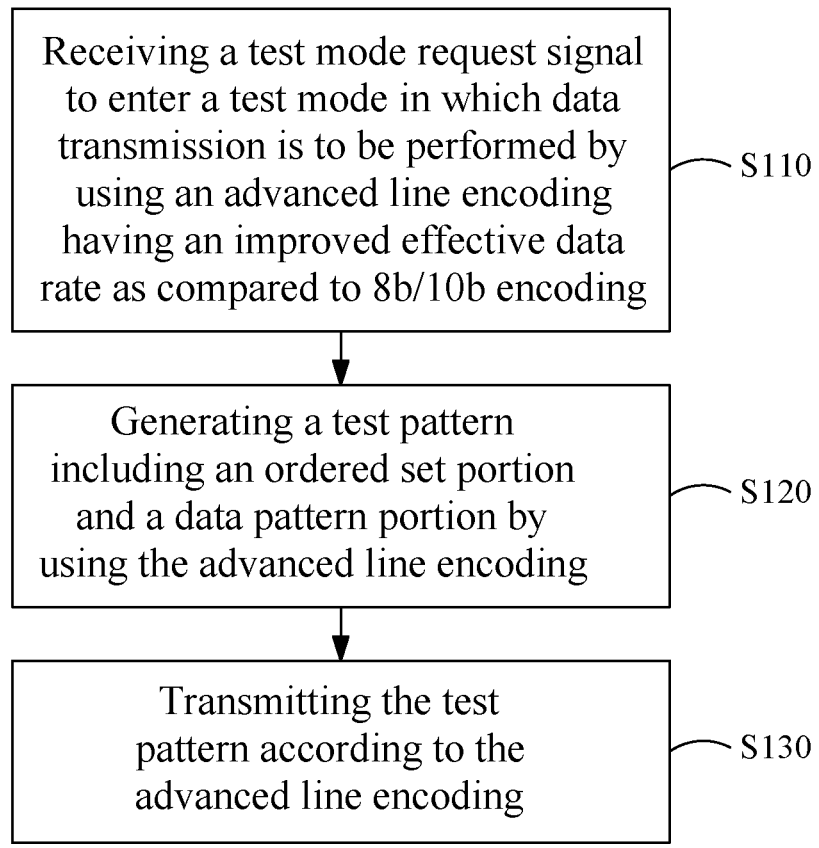
FIG. 6A is a flowchart illustrating an embodiment of a method for facilitating testing for an interconnection protocol with ALE.

FIG. 6A illustrates an embodiment of a method for facilitating testing for an interconnection protocol with ALE. The method can be implemented in an electronic device (e.g., a first device 10) capable of communicating with another electronic device (e.g., a second device 20) according to the interconnection protocol, wherein the electronic device and the other electronic device may be a local host and remote device respectively, or vice versa. As illustrated in FIG. 6A, the method includes operations S110, S120, and S130.

In the operation S110, a test mode request signal is received at a controller of the electronic device, wherein the test mode request signal indicates entering a test mode in which data transmission is to be performed by using an advanced line encoding having an improved effective data rate as compared to 8b/10b encoding. The advanced line encoding mode indicates that the electronic device is capable of data transmission by using an advanced line encoding having an improved effective data rate as compared to 8b/10b encoding.

In the operation S120, a test data signal indicating a test pattern including an ordered set portion and a data pattern portion by using the advanced line encoding is generated at the controller.

In the operation S130, the test data signal is transmitted through the electronic device to the other electronic device according to the advanced line encoding.

At the operation S110, the test mode request signal can be triggered or generated at the electronic device locally or remotely. For example, in the controller of the electronic device for implementing a modified version of the interconnection protocol, a DME is capable of receiving a test mode request from an application program such as a test program or a piece of firmware of a controller of the first device 10 and sending a corresponding test mode request signal to the PA layer, and the PA layer receives the test mode request signal according to the operation S110.

At the operation S120, the test data signal can be generated locally or remotely. The test data signal indicates a test pattern, for example, as described in any example associated with TABLE 5 or 6.

At the operation S130, the test data signal is transmitted through the electronic device to the other electronic device in the advanced line encoding mode. For example, the ordered set is not scrambled and the data blocks are scrambled.

The method of FIG. 6A can be applied in a process for test mode under the advanced line encoding mode. For example, whenever an electronic device capable of communicating with another electronic device according to the interconnection protocol is required to enter the ALE PHY test mode, the electronic device can apply the method of FIG. 6A and then perform one or more additional operations such as obtaining test results, obtaining an attribute or setting an attribute for testing or other purposes. In the test mode, a test pattern can ensure bit-level relock and re-alignment and block-level relock and re-alignment. As a whole, the method of FIG. 6A can be applied in the electronic device to enhance reliability of the link in the advanced line encoding mode when the testing is to perform in response to the test request. In addition, the method of FIG. 6A can ensure that the counterpart or peer side can be informed of test data or can be triggered to perform appropriate operations for testing in the advanced line encoding mode effectively and efficiently.

Moreover, in the advanced line encoding mode, 8b/10b coding in M-PHY is not used and the physical layer of the interconnection protocol with ALE may be implemented to perform bits transmission using a specific signaling scheme. In some embodiment, an electronic device may be implemented according to the interconnection protocol with an advanced line encoding scheme, such as 128b/129b, 128b/

130b, or 128b/132b, or so on, in conjunction with a signaling scheme, such as PAM-n (e.g., PAM-4) or so on, to enhance overall effective data rates in normal operation mode for data transmission. In these embodiments, the link of the electronic device in the advanced line encoding mode may have a bit error rate higher than that of the 8b/10b coding scheme in conjunction with a NRZ signaling. In this case, when the ALE PHY test mode is requested, the method of FIG. 6A can ensure that the counterpart or peer side can be informed of the test data or can be triggered to perform appropriate operations for testing in the advanced line encoding mode effectively and efficiently.

Figure 6B:
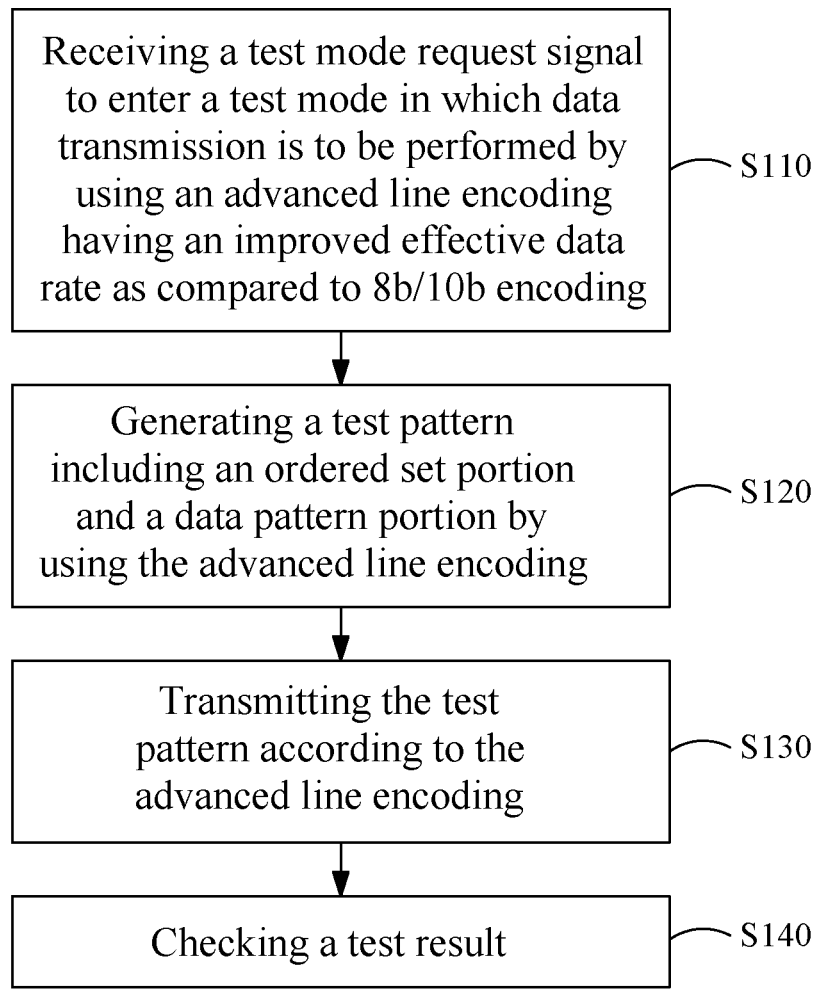
FIG. 6B is a flowchart illustrating another embodiment of a method for facilitating testing for an interconnection protocol with ALE.

FIG. 6B illustrates another embodiment of a method for facilitating testing for an interconnection protocol with ALE. As compared to the method in FIG. 6A, the method in FIG. 6B further includes an operation S140 in addition to the operations S110, S120, and S130. In the operation S140, information of a test result associated with the test data can be obtained from either the electronic device or the other electronic device (i.e., local or remote side) and the test result is then checked according to the information obtained.

Figure 7:
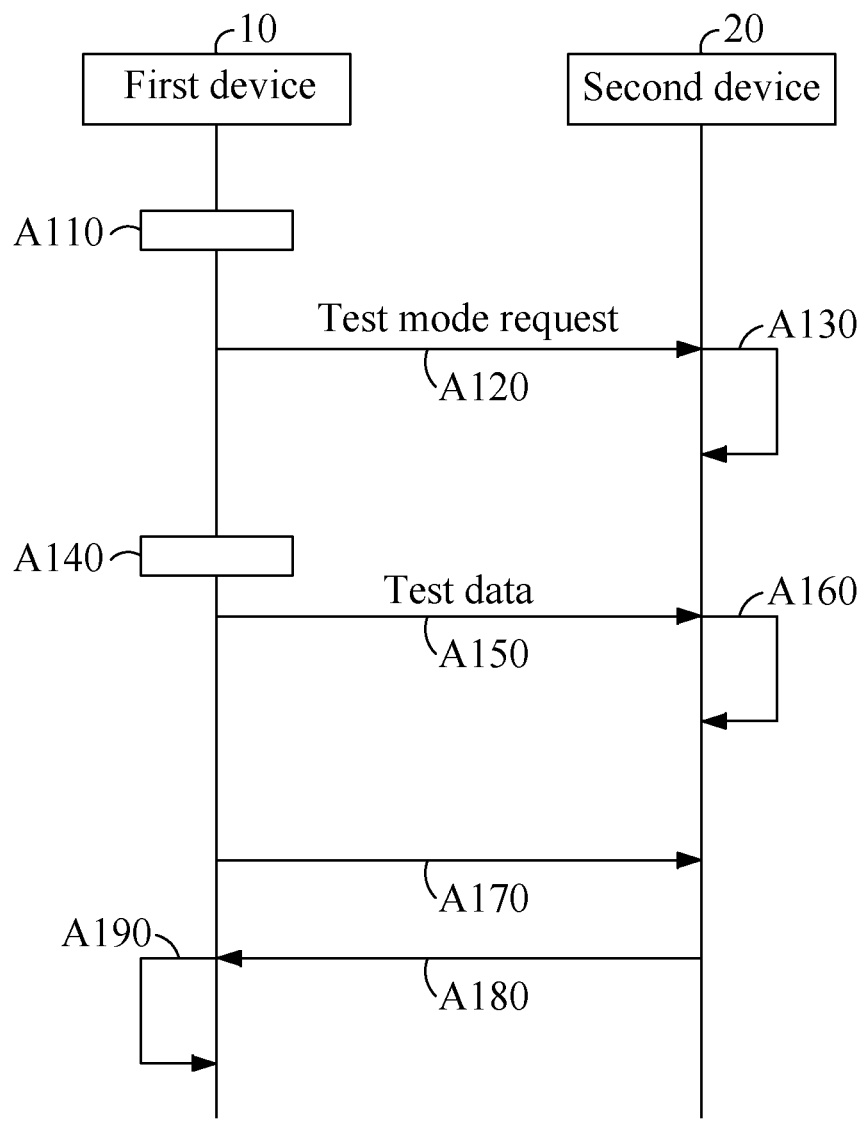
FIG. 7 is a diagram illustrating an embodiment of a process of testing in an advanced line encoding mode, on the basis of the method of FIG. 6A.

FIG. 7 illustrates an embodiment of a process of testing under an advanced line encoding mode, on the basis of the method of FIG. 6A or FIG. 6B. As illustrated in FIG. 7, a first device 10 (e.g., an electronic device) is capable of communicating with a second device 20 (e.g., another electronic device) according to the interconnection protocol, wherein the first device 10 and second device 20 may be a local host and remote device respectively, or vice versa. In FIG. 7, it is required to configure the first device 10 to enter an ALE PHY test mode for testing and to send test data to the second device 20. In operation A110, the first device 10 receives a test mode request for entering the ALE PHY test mode, wherein the first device 10 performs operations for preparation in response. In operation A120, the first device 10 sends a test mode request to the second device 20 (or a peer side) for entering the ALE PHY test mode. In operation A130, the second device 20 receives the test mode request from the first device 10, wherein the second device 20 performs some operations for preparation in response. In operation A140, in response to a request for sending test data in the first device 10, the first device 10 generates the test data (e.g., test pattern as exemplified in an example related to TABLE 5 or 6) by using the advanced line encoding under the advanced line encoding mode. In operation A150, the first device 10 sends the test data to the second device 20. In operation A160, the second device 20 receives the test data, wherein the second device 20 can examine the test data and check whether the test data received is corrected or not. The operations A140, A150, and A160 can be repeated. Further, in operation A170, the first device 10 can send a request to the second device 20 for obtaining information, such as test results, or other information. In operation A180, the second device 20 sends the information to the first device 10 in response to the request for obtaining information. In operation A190, the first device 10 can handle the information sent by the second device 20 for a purpose such as testing. In an example, the first device 10 obtains information of a test result associated with the test data from the second device 20 and checks the test result according to the obtained information. The information of the test result includes data associated with the test result, such as number of passed test data frames and number of failed test data frames at the local side during the test pattern transmission.

In FIG. 7, the operations A110, A140, and A150 are based on the method of FIG. 6A, with respect to the first device 10. The operations A110, A140, A150, and A190 are based on the method of FIG. 6B, with respect to the first device 10. Further, in some embodiments, one or more methods for facilitating testing can be obtained or further derived from the process of FIG. 7. For example, a method for facilitating testing is provided with respect to the first device 10 and includes the operations A110, A140, A150, A170, and A190. For example, a method for facilitating testing is also provided with respect to the second device 20 according to associated operations in FIG. 7 and includes the operations A130, A160, and A180. In addition, for example, a method for facilitating testing is provided with respect to the first device 10 and second device 20 according to associated operations in FIG. 7 and includes the operations A110, A140, A150, and A190 with respect to the first device 10 and the operations A130, A160, and A180 with respect to the second device 20.

Figure 8:
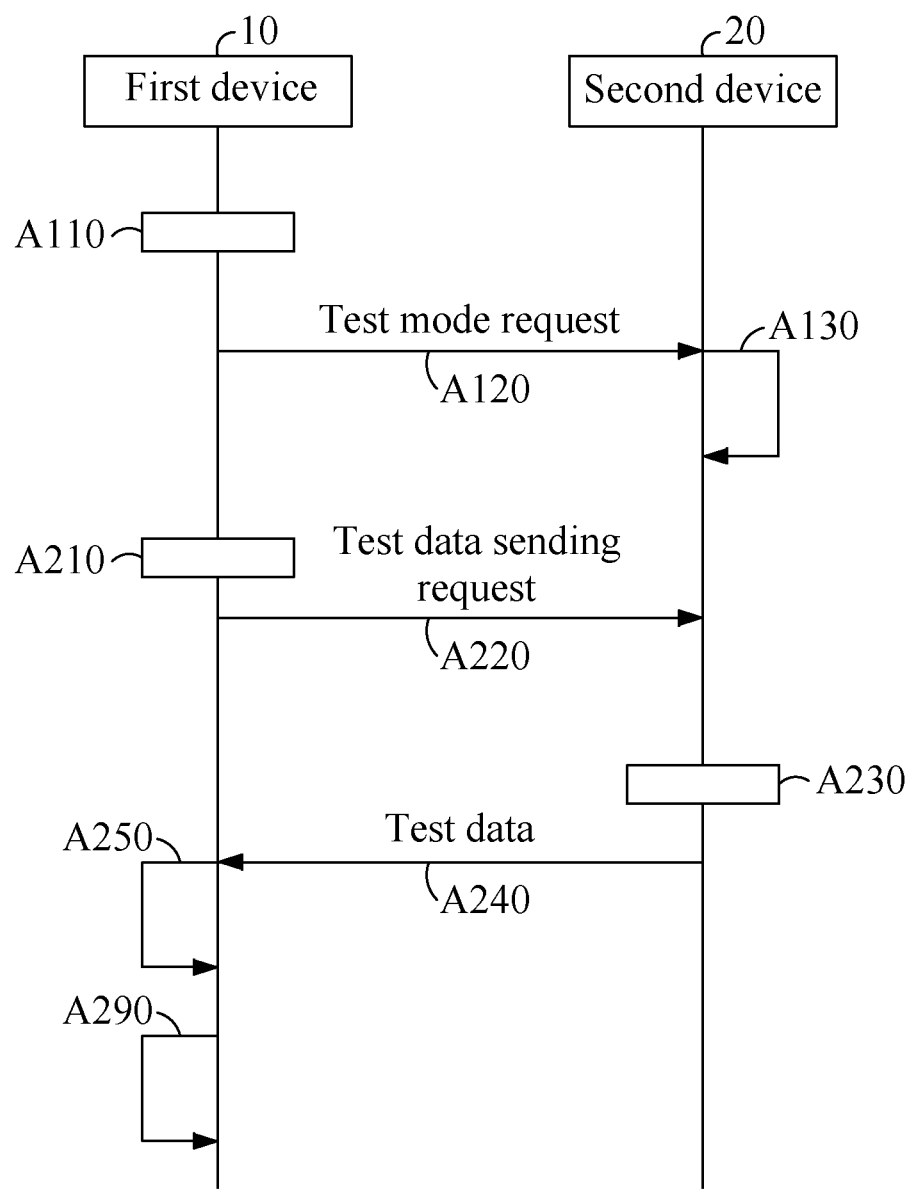
FIG. 8 is a diagram illustrating another embodiment of a process of testing in an advanced line encoding mode, on the basis of the method of FIG. 6A.

FIG. 8 illustrates an embodiment of a process of testing under an advanced line encoding mode, on the basis of the method of FIG. 6A. In FIG. 8, it is required to configure the first device 10 to enter an ALE PHY test mode for testing and to configure the second device 20 to send test data to the first device 10. In operation A110, the first device 10 receives a test mode request for entering the ALE PHY test mode, wherein the first device 10 performs operations for preparation in response. In operation A120, the first device 10 sends a test mode request to the second device 20 (or a peer side) for entering the ALE PHY test mode. In operation A130, the second device 20 receives the test mode request from the first device 10, wherein the second device 20 performs some operations for preparation in response. In operation A210, a request to require the peer side (e.g., second device 20) to send test data is received in the first device 10. In operation A220, the first device 10 sends the request to the second device 20. In operation A230, in response to the request to send test data, the second device 20 generates the test data (e.g., test pattern as exemplified in an example related to TABLE 5 or 6) by using the advanced line encoding under the advanced line encoding mode. In operation 240, the second device 20 sends the test data to the first device 10. In operation A250, the first device 10 receives the test data, wherein the first device 10 can examine the test data and check whether the test data received is corrected or not. The operations A210, A220, A230, A240, and A250 can be repeated. Further, the first device 10 may send a request locally for obtaining information, such as test results, or other information. For example, in operation A290, information of a test result associated with the test data is obtained from the first device 10 and the test result is then checked according to the obtained information. The information of the test result includes data associated with the test result, such as number of passed test data frames and number of failed test data frames at the local side during the test pattern transmission.

In FIG. 8, the operations A130, A230, and A240 are based on the method of FIG. 6A, with respect to the second device 20. Further, in some embodiments, one or more methods for facilitating testing can be obtained or further derived from the process of FIG. 8. For example, a method for facilitating testing based on the method of FIG. 6B is provided according to associated operations in FIG. 8 and the operations A130, A230, A240, A250, and A290. For example, a method for facilitating testing is provided with respect to the first device 10 and second device 20 according to associated operations in FIG. 8 and includes the operations A110, A120, A210, A250, and A290 with respect to the first device 10 and the operations A130, A230, and A240 with respect to the second device 20.

The method illustrated in FIG. 7 or FIG. 8 can also be regarded as a simplified process representing a variety of processes for performing testing that may be encountered in practical scenarios. Regarding this, examples are illustrated below for scenarios involving implementation of the ALE PHY test mode.

Figure 9:
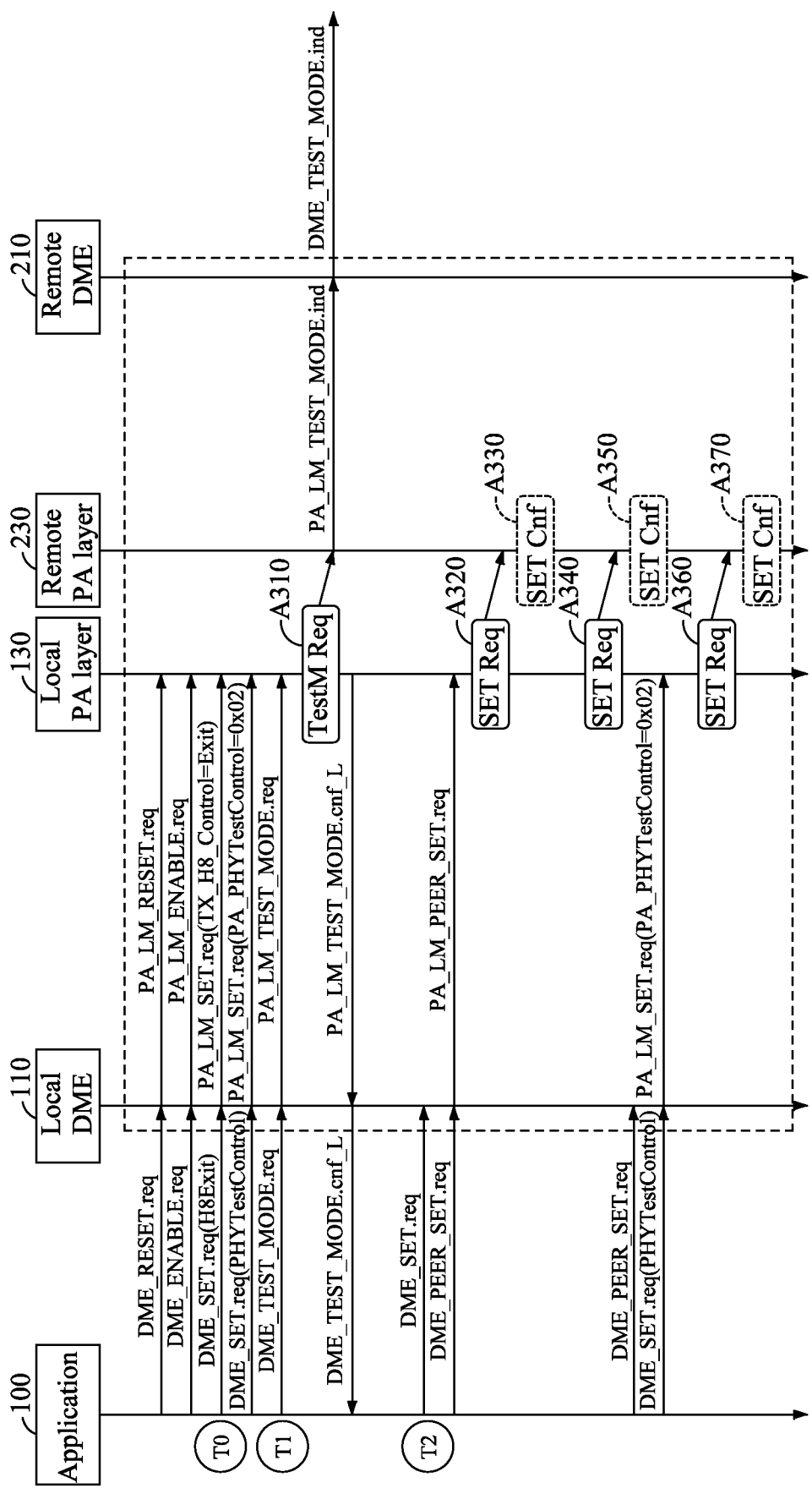
FIG. 9 is a diagram illustrating an example of a process for facilitating entering an ALE PHY test mode.

FIG. 9 illustrates an example of a process for facilitating entering an ALE PHY test mode. Before demonstration of the process, some assumptions are mentioned as follows. On the left side of FIG. 9 or so on, an application (or application layer) 100, represented by a rectangle, performs operations indicated along a vertical timeline and may be implemented as a test program executed in the first device 10 or a piece of firmware of a controller of the first device 10. The application 100 communicates with the modified version of UniPro of the interconnection protocol via a DME service access point (e.g., DME_SAP). In FIG. 9 or similar Figures such as FIGS. 10 and 11, a local DME 110 and a local PA layer 130 are represented by respective rectangles, which can be implemented by respective modules or circuits of a controller for use in the first device 10 of FIG. 7 or FIG. 8 while a remote DME 210 and a remote PA layer 230 are shown by respective rectangles, which can be implemented by respective modules or circuits of a controller for use in the second device 20 of FIG. 7 or FIG. 8. In addition, interactions among the application 100, local DME 110, local PA layer 130, remote DME 210, and remote PA layer 230 are represented by arrows with legends above arrows shown in FIG. 9 or similar Figures, wherein the legends indicate primitives, which may be implemented as messages or signals indicating control or data information, as described in the UniPro specification (e.g., UniPro version 2.0). In addition, the operations along the timelines can be described by a number of phases starting at different time points, and each phase is represented by a circle with a legend "T0", "T1", or the like, for the sake of explanation.

In addition, in an embodiment of the interconnection protocol with ALE, the physical layer can be implemented to support an ALE scheme in one or more operating mode or gears, which can be referred to as an ALE mode collectively, wherein configuration attributes for the physical layer (e.g., a modified version of M-PHY), such as M-TX operating mode (denoted by TX_MODE), HS-GEAR value of M-TX (denoted by TX_HSGEAR), M-RX operating mode (denoted by RX_MODE), and HS-GEAR value of M-RX (denoted by RX_HSGEAR) can be defined for ALE.

Referring to FIG. 9, an example of a process for facilitating entering an ALE PHY test mode is shown. The process in FIG. 9 can be regarded as an example of a process for facilitating entering an ALE PHY test mode on the basis of the operations A110, A120, and A130 illustrated in FIG. 7. The process in FIG. 9 can be implemented in a manner similar to or derived from that described in the UniPro specification (e.g., UniPro version 2.0). The process for facilitating entering an ALE PHY test mode is performed under a legacy coding scheme for both the local and remote sides.

Initially, the application 100 uses a DME_RESET.req primitive to trigger a reset procedure to reset the DME and the UniPro stack. During the reset procedure, the local DME 110 uses a PA_LM_RESET.req primitive to request the PA_LM (e.g., as shown in FIG. 3) to reset the PA Layer and PHY Layer. After the reset procedure is completed, the application 100 uses a DME_ENABLE.req primitive to trigger an enable procedure to enable the UniPro stack. During the enable procedure, the local DME 110 uses a PA_LM_ENABLE_LAYER.req primitive to enable the PA Layer. After the enable procedure, the application 100 starts preparation for requesting entering ALE PHY test mode. The operations in different phases denoted by T0, T1, and T2 are described as follows.

In phase T0, the application 100 uses a DME_SET.req (H8Exit) primitive to wake up a local physical layer (e.g., a modified version of M-PHY) and then uses a DME_SET.req (PHYTestControl=0x02) primitive to trigger a re-configuration trigger (RCT), thereby waking up all available lanes of the local physical layer and updating the physical layer. It is noted that there is no link start up request.

In phase T1, the application 100 launches a DME_TEST_MODE.req primitive with a legacy coding scheme (e.g., 8b/10b coding) to request the peer device (e.g., second device 20) to enter a test mode. Afterward, both the local side and remote side enter PHY Test Mode with the legacy coding scheme.

Specifically, at the phase T1, the local DME 110 forwards the request, DME_TEST_MODE.req, to the local PA Layer 130 by generating a PA_LM_TEST_MODE.req primitive. In response, the local PA Layer 130 sends a PACP_TEST_MODE_req frame, as shown in operation A310 with a legend "TestM req." Afterwards, the local PA Layer 130 responds with a PA_LM_TEST_MODE.cnf_L primitive to inform the completion of the request. The local DME 110 sends a DME_TEST_MODE.cnf_L primitive to the application 100 after reception of the PA_LM_TEST_MODE.cnf_L primitive indicating that the request has been sent to the peer Device. On the other hand, the remote PA layer 230 uses a PA_LM_TEST_MODE.ind primitive to report the reception of a request (i.e., PACP_TEST_MODE_req frame) to put the remote PA Layer 230 in a given test mode. When receiving the PA_LM_TEST_MODE.ind primitive, the remote DME 210 uses a DME_TEST_MODE.ind primitive to indicate to the user (e.g., a corresponding application) of the remote DME 210 that the UniPro stack has been put in to a certain test mode.

In phase T2, the local physical layer (e.g., local side M-PORT) is programmed (or configured) via a DME_SET.req primitive, and the remote physical layer (e.g., remote side M-PORT) is programmed (or configured) via a DME_PEER_SET.req primitive. M-PORT stands for an interface port composed of a set of M-TXs and M-RXs in a device such as a host device or remote device, wherein M-TX represents a transmitter or M-PHY transmit MODULE, and M-RX represents a receiver or M-PHY receive MODULE, according to the M-PHY specification (e.g., M-PHY version 5.0).

Specifically, at the phase T2, certain management information base (MIB) attributes, such as PA layer-specific MIB (PA_MIB) attributes and PHY layer-specific MIB attributes, are programmed (or configured) for different power mode operation. For example, the following PA layer attributes PA_ConnectedTxDataLanes, PA_ConnectedRxDataLanes, PA_ActiveTxDataLanes, PA_ActiveRxDataLanes, PA_LogicalLaneMap, PA_SleepNoConfigTime, and PA_StallNoConfigTime, are set according to section 5.7.17 of the UniPro specification (e.g., UniPro version 2.0). In addition, the configuration attributes for the physical layer (e.g., a modified version of M-PHY), such as TX_MODE, TX_HSGEAR, RX_MODE, and RX_HSGEAR are set for ALE. During the phase T2, the local DME 100 forwards a request (DME_PEER_SET.req) for setting a MIB attribute at the peer side to the local PA Layer 130 by generating a PA_LM_PEER_SET.req primitive. On receiving the PA_LM_PEER_SET.req primitive, the local PA layer 130 sends a PACP_SET_req frame, as shown in operation A320 with a legend of "SET Req," to the peer side. When receiving the PACP_SET_req frame, the remote PA layer 230 sends a PACP_SET_cnf frame, optionally, as shown in operation A330 with a legend of "SET Cnf," to the local side to acknowledge the reception of the PACP_SET_req frame. The process for setting an attribute at the peer side is repeated, as shown in operation A340 and operation A350 (optional) similar to the operations A320 and A330 respectively, until all required attributes are set. In the phase T2, after the required attributes are set, the application 100 performs the final attribute setting in the programming operation (or called configuration operation) by using a DME_SET.req to set the PA_PHYTestControl attribute to 0x02 (e.g., CfgReady=1) to trigger a RCT for the physical layer (e.g., the modified version of M-PHY). In response, the local DME 110 sends a PA_LM_SET.req primitive to set PA_PHYTestControl to '0x02.' In response, the local PA layer 130 sends a PACP_SET_req frame, as shown in operation A360 to the peer side to set PA_PHYTestControl to '0x02' and the remote PA layer 230 replies with a PACP_SET_cnf frame, optionally, as shown in operation A370.

After the phase T2, both the physical layers of the local side and remote side enter an expected power mode. Because the configuration attributes for the physical layer are set for ALE in the phase T2, the physical layers of the local side and remote side will enter the ALE mode on a next burst once a request for sending test patterns is received. The following examples show scenarios of the local side or remote side to send ALE test patterns.

Figure 10:
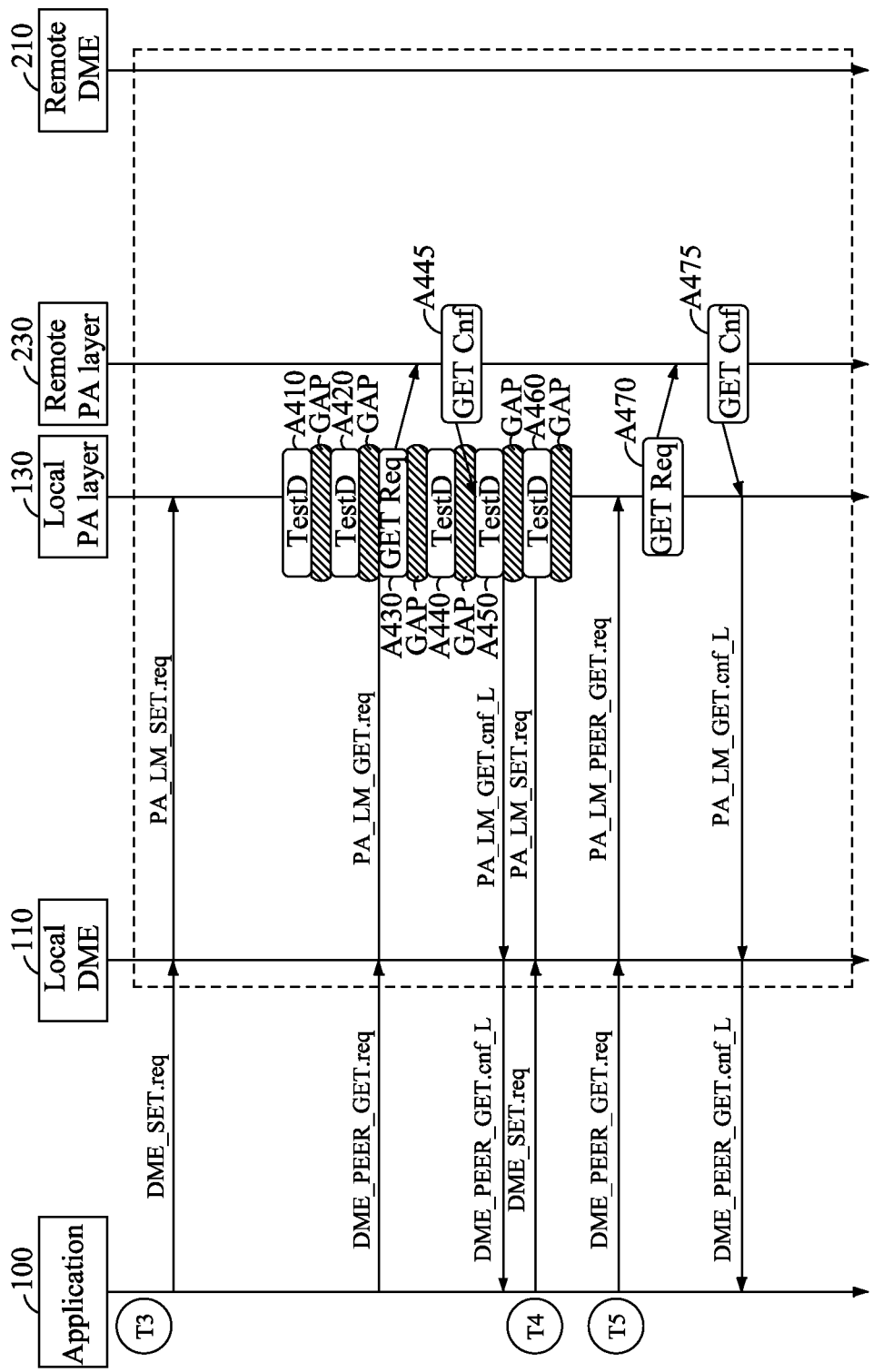
FIG. 10 is a diagram illustrating an example of a process for performing testing in the ALE PHY test mode.

FIG. 10 illustrates an example of a process for performing testing in the ALE PHY test mode. In this example, the process in FIG. 10 is performed after the process for facilitating entering the ALE PHY test mode in FIG. 9 is completed. The process in FIG. 10 can be regarded as an example of a process for performing testing in the ALE PHY test mode on the basis of the operations A140, A150, A160, A180, and A190 illustrated in FIG. 7. The process in FIG. 10 is different from the process for conventional PHY testing described in the UniPro specification (e.g., UniPro version 2.0) because the process in FIG. 10 is performed based on an ALE coding scheme for both the local and remote sides. In particular, both the local side and the remote side operate in an ALE mode after the local side is triggered to send ALE test patterns to the remote side. In FIG. 10, the operations in different phases denoted by T3, T4, and T5 are described as follows.

In phase T3, the application 100 of the local side uses a DME_SET.req primitive to start an ALE PHY test. For example, the DME_SET.req primitive is used to set both ALETestPatternSelectEnable and TestPatternTransmit to '1' in the PA_PHYTestControl attribute in order to enable an ALE test pattern transmission. The local DME 110 forwards the request, i.e., DME_SET.req, to the local PA Layer 130 by generating a PA_LM_SET.req primitive. In response, a new burst transmission using ALE (or referred to as ALE burst transmission) for ALE test pattern is opened (or called started) from the local PA layer 130 to the remote PA layer 230. After the ALE burst transmission is opened, the local PA Layer 130 sends ALE test patterns, for example, according to ALE_COMP_x described in TABLE 5 and TABLE 6. In this ALE burst transmission, the pair of ordered sets {SKP OS+SDS OS}, represented by PA_ALE_LANE_ALIGN, is inserted on the first test loop of a test pattern, for example, such as that described in TABLE 6. In addition, an SKP OS is inserted for remaining test loops of the test pattern. As described in TABLE 6, the local PA layer 130 sends a plurality of PACP ALE test data frames such as PACP_ALE_TEST_DATA_y (where y=0, 1, 2, or 3) to the remote PA layer 230. For sake of illustration, operations A410, A420, A440, A450, and A460 (denoted by "TestD") represent that the PACP test data frames of the first test loop to some subsequent test loops are sent respectively. In another example, more PACP test data frames may be sent. In addition, there may have gap times (or processing latencies), as represented by graph symbols denoted by "GAP," among the PACP test data frames. After the last test data frames of the test pattern is being sent, the local side finishes the test pattern transmission and does another round of test pattern transmission when ContBurst is set to '1' in the TestPatternTransmit attribute. Otherwise, the ALE burst transmission will be closed.

In addition, in contrast to PHY testing that uses the legacy coding scheme (e.g., 8b/10b coding scheme in the conventional UniPro) with scrambling always switched off, the ALE PHY test mode enables scrambling for PACP test data frame, wherein neither PA_ALE_LANE_ALIGN nor SKP OS is involved in scrambling.

In addition, the conventional UniPro IDLE symbol encoding is not used in the ALE PHY test mode.

In an embodiment, the interconnection protocol can be implemented to support obtaining the value of an attribute of the remote side during the ALE PHY test mode. For example, the application 100 of the local side may send a DME_PEER_GET.req primitive to obtain the value of an attribute at the peer side. On receiving the DME_PEER_GET.req primitive, the local DME 110 sends a PA_LM_GET.req primitive to the local PA layer 130. In response to the PA_LM_GET.req primitive, the local PA layer 130 sends a PACP_GET_req frame, as shown in operation A430 with a legend of "GET Req," to the peer side to request for the value of an attribute. On receiving the PACP_GET_req frame, the remote PA layer 230 sends a PACP_GET_cnf frame, as shown in operation A445 with a legend of "GET Cnf," to the local side to return the value of the attribute. In response to the PACP_GET_cnf frame, the local PA layer 130 sends a PA_LM_GET.cnf_L to the local DME 110. The local DME 110 then sends a DME_PEER-GET.cnf_L primitive to the application 100.

Further, at the phase T3, for example, if ContBurst in the PA_PHYTestControl attribute is set to '0', PA Layer TX creates a new burst for each transmitted PACP frame. When there is no data to be sent, the M-TX is in SAVE state. If ContBurst is set to '1' in the PA_PHYTestControl attribute, PA Layer TX keeps the M-TX in BURST mode. For example, when there is no data to be sent, the PA Layer TX sends FILLERs. PACP frames comprising payload data with repetitive test pattern, like one of the ALE test patterns, are sent back to back with a minimum amount of FILLERs being inserted between successive Frames.

In phase T4, in case of ContBurst in the PA_PHYTest-Control attribute set to '1', the local side can stop test pattern transmission through a DME_SET.req primitive which is used to set TestPatternTransmit to '0' in the PA_PHYTest-Control attribute. The local side will stop the test pattern transmission on a proper time. For example, the application 100 sends the DME_SET.req primitive to stop the test pattern transmission. In response, the local DME 110 sends a PA_LM_SET.req primitive to the local PA layer 130. The local PA layer 130 receives the PA_LM_SET.req primitive while sending the PACP test data frame to the peer side as shown in operation A460. Accordingly, the local PA layer 130 stops the test pattern transmission after the PACP test data frame is sent (e.g., after operation A460).

In phase T5, the local side uses a DME_PEER_GET.req primitive to check test results from certain MIB attributes of the receiver of the remote side. For example, the application 100 can obtain number of passed test data frames and number of failed test data frames at the remote side during the test pattern transmission by using the DME_PEER_GET.req primitive to obtain corresponding counter values (e.g., corresponding to PA_PACPFrameCount and PA_PACPErrorCount attributes) for the two numbers.

For example, the application 100 of the local side may send a DME_PEER_GET.req primitive to obtain the value of an attribute such as PA_PACPFrameCount or PA_PACPErrorCount at the peer side. The process for the DME_PEER_GET.req in this example can be performed according to the above embodiment for obtaining the value of an attribute of the remote side. For the sake of brevity, the detailed operations will not be repeated. In brief, in response to DME_PEER_GET.req, the local side sends a PACP_GET_req frame, as shown in operation A470, to the peer side to request for the value of an attribute. On receiving the PACP_GET_req frame, the peer side sends a PACP_GET_cnf frame, as shown in operation A475, to the local side to return the value of the attribute. In this manner, the application 100 eventually can receive the values of PA_PACPFrameCount and PA_PACPErrorCount and check the test results according to the values of PA_PACPFrameCount and PA_PACPErrorCount.

Figure 11:
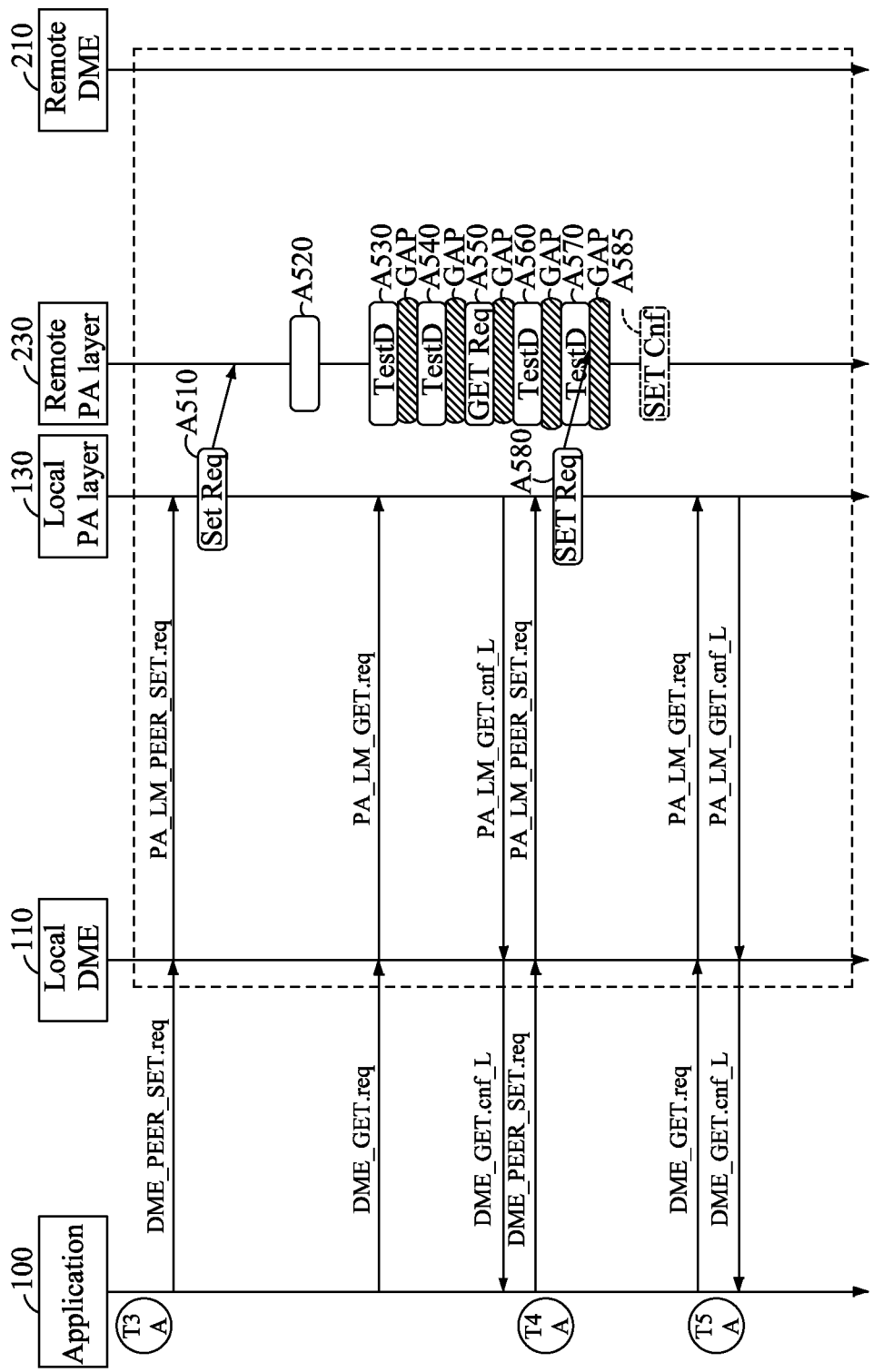
FIG. 11 is a diagram illustrating another example of a process for performing testing in the ALE PHY test mode.

FIG. 11 illustrates another example of a process for performing testing in the ALE PHY test mode. In this example, the process in FIG. 11 is also performed after the process for facilitating entering the ALE PHY test mode in FIG. 9 is completed. The process in FIG. 11 can be regarded as an example of a process for performing testing in the ALE PHY test mode on the basis of the operations A210, A220, A230, A240, and A250 illustrated in FIG. 8. The process in FIG. 11 is different from the process for conventional PHY testing described in the UniPro specification (e.g., UniPro version 2.0) because the process in FIG. 11 is performed based on an ALE coding scheme for both the local and remote sides. In particular, both the local side and the remote side operate in an ALE mode after the remote side is triggered to send ALE test patterns to the local side. In FIG. 11, the operations in different phases denoted by T3A, T4A, and T5A are described as follows.

In phase T3A, the application 100 of the local side uses a DME_PEER_SET.req primitive to start an ALE PHY test. For example, the DME_PEER_SET.req primitive is used to set both ALETestPatternSelectEnable and TestPatternTransmit to '1' in the PA_PHYTestControl attribute in the remote side in order to enable an ALE test pattern transmission. The local DME 110 forwards the request, i.e., DME_PEER_SET.req, to the local PA Layer 130 by generating a PA_LM_PEER_SET.req primitive. In response, the local PA layer 130 sends a PACP_SET_req frame to the remote PA layer 230, as shown in operation A510. After receiving the PACP_SET_req frame, a new burst transmission using ALE (or referred to as ALE burst transmission) for ALE test pattern is opened from the remote PA layer 230 to the local PA layer 130, as represented by operation A520. After the ALE burst transmission is opened, the remote PA layer 230 sends ALE test patterns, for example, according to ALE_COMP_x described in TABLE 5 and TABLE 6. In this ALE burst transmission, the pair of ordered sets {SKP OS+SDS OS}, represented by PA_ALE_LANE_ALIGN, is inserted on the first test loop of a test pattern, for example, such as that described in TABLE 6. In addition, an SKP OS is inserted for remaining test loops of the test pattern. As described in TABLE 6, the remote PA layer 230 sends a plurality of PACP ALE test data frames such as PACP_ALE_TEST_DATA_y (where y=0, 1, 2, or 3) to the local PA layer 130. For sake of illustration, operations A530, A540, A550, A560, and A570 (denoted by "TestD") represent that the PACP test data frames of the first test loop to some subsequent test loops are sent respectively. In another example, more PACP test data frames may be sent. In addition, there may have gap times (or processing latencies), as represented by graph symbols denoted by "GAP," among the PACP test data frames. After the last test data frames of the test pattern is being sent, the local side finishes the test pattern transmission and does another round of pattern transmission when ContBurst is set to '1' in the TestPatternTransmit attribute. Otherwise, the ALE burst transmission will be closed.

In phase T4A, in case of ContBurst in the PA_PHYTestControl attribute set to '1', the local side (or called tester) can stop test pattern transmission through a DME_PEER_SET.req primitive which is used to set TestPatternTransmit to '0' in the PA_PHYTestControl attribute. The remote side will stop the test pattern transmission on a proper time. For example, the application 100 sends the DME_PEER_SET.req primitive to stop the test pattern transmission. In response, the local DME 110 sends a PA_LM_PEER_SET.req primitive to the local PA layer 130. On receiving the PA_LM_PEER_SET.req primitive, the local PA layer 130 sends a PACP_SET_req frame to the peer side, as shown in operation A580. While sending the PACP test data frame to the remote side as shown in operation A570, the remote PA layer 230 receives the PACP_SET_req frame to request stopping the test pattern transmission. Accordingly, the remote PA layer 230 stops the test pattern transmission after the PACP test data frame is sent (e.g., after operation A570). Optionally, as shown in operation A585, the remote PA layer 230 then sends a PACP_SET_cnf frame to the local side to report that the test pattern transmission is stopped.

In phase T5A, the local side (or the tester) uses a DME_GET.req primitive to check test results from certain MIB attributes of the receiver of the local side. For example, the application 100 can obtain number of passed test data frames and number of failed test data frames at the local side during the test pattern transmission by using the DME_GET.req primitive to obtain corresponding counter values (e.g., corresponding to PA_PACPFrameCount and PA_PACPErrorCount attributes) for the two numbers. The local DME 110 sends a PA_LM_GET.req primitive to the local PA layer 130 to request the value of the attribute. The local PA layer 130 then sends a PA_LM_GET.cnf_L primitive to the local DME 110. The local DME 110 eventually sends a DME_GET.cnf_L primitive to the application 100 to report the value of the attribute to the application 100.

In addition, the local side can optionally use a DME_GET.req primitive to obtain the value of an attribute during the phase T3A. The process for the DME_GET.req is similar to the case as exemplified in the embodiment for FIG. 11 during the phase T4A.

In further examples, the application 100 can program or configure the local side or remote side to send ALE test patterns by using a DME_SET.req primitive (e.g., in the phase T3 of FIG. 9) or a DME_PEER_SET.req primitive (e.g., in the phase T3A of FIG. 10). During an ALE PHY test, the local side or remote side can be triggered to send ALE test patterns, such as the local side first and then the remote side, in an alternate manner, or in any order. After the ALE test pattern transmission is stopped, the application 100 can use DME_PEER_GET.req or DME_GET.req to check the test result.

In the example related to that of FIG. 10 or FIG. 11, the PA Layer (e.g., local side or remote side) can be implemented to have two counters for counting received PACP frames, e.g., a counter (PA_PACPFrameCount) for number of valid PACP frames received and another counter (PA_PACPErrorCount) for number of erroneous PACP frames received. PA_PACPFrameCount can be incremented by one if the received frame has a valid FunctionID and passes the checksum verification. PA_PACPErrorCount can be incremented by one when an error in the PACP test data frame is detected. The error may be a checksum error in a PACP test data frame, or other errors, such as for each PACP start symbol that is not part of a PACP frame. A PA_LM_SET request to PA_PACPFrameCount or PA_PACPErrorCount can set the counter to zero. Accordingly, the application 100 can further check the test results by using values of PA_PACPFrameCount and PA_PACPErrorCount.

Certainly, the implementation of the ALE mode of present disclosure and its associated test mode is not limited to the examples above, such as the format or contents of the unit of information for data transmission and so on. In an embodiment of an ALE mode, a unit of information for data transmission can be defined as an "ALE frame" which may include a specific number of ALE blocks with additional CRC codes such as CRC64 and forward error correction (FEC) codes to detect or correct the ALE blocks for data transmission reliability. In such an embodiment, ALE test patterns can be implemented, similar to or according to examples of TABLE 5 and TABLE 6, and further with CRC64 and error correction codes (ECC). Following this embodiment, the PA Layer (e.g., local side or remote side) can be implemented to have one or more counters for counting received ALE frames or various errors for specific purposes, which are not mentioned in the conventional UniPro specification (e.g., UniPro version 2.0). For example, an ALE frame counter (e.g., denoted by PA_ALEFrameCount) can be implemented to be incremented by one if the received ALE frame has no un-recovered ECC error and passes CRC64 residue check. For example, an ALE CRC error counter (e.g., denoted by PA_ALECRCErrorCount) can be implemented to be incremented by one if the received ALE frame has no un-recoverable ECC error encountered but is fails to pass CRC64 check. For example, an ALE first error counter (e.g., denoted by PA_ALEErrorCount1) can be implemented to be incremented by one if the received ALE frame has ECC error encountered, regardless of recoverable or un-recoverable error. For example, an ALE second error counter (e.g., denoted by PA_ALEErrorCount2) can be implemented to be incremented by one if the received ALE frame has un-recoverable ECC error encountered. Accordingly, the application 100 can further check the test results by using values of one or more these counters. As such, a method according to one or more embodiments illustrated in FIGS. 6A, 6B, 7, and 8 can facilitate PHY testing for an interconnection protocol with ALE effectively and provide implementation flexibility for the PA layer to create counters related to testing and for the test application to check test results.

The following provides various embodiments for implementation of the interconnection protocol with the ALE according to FIG. 1.

Figure 12A:
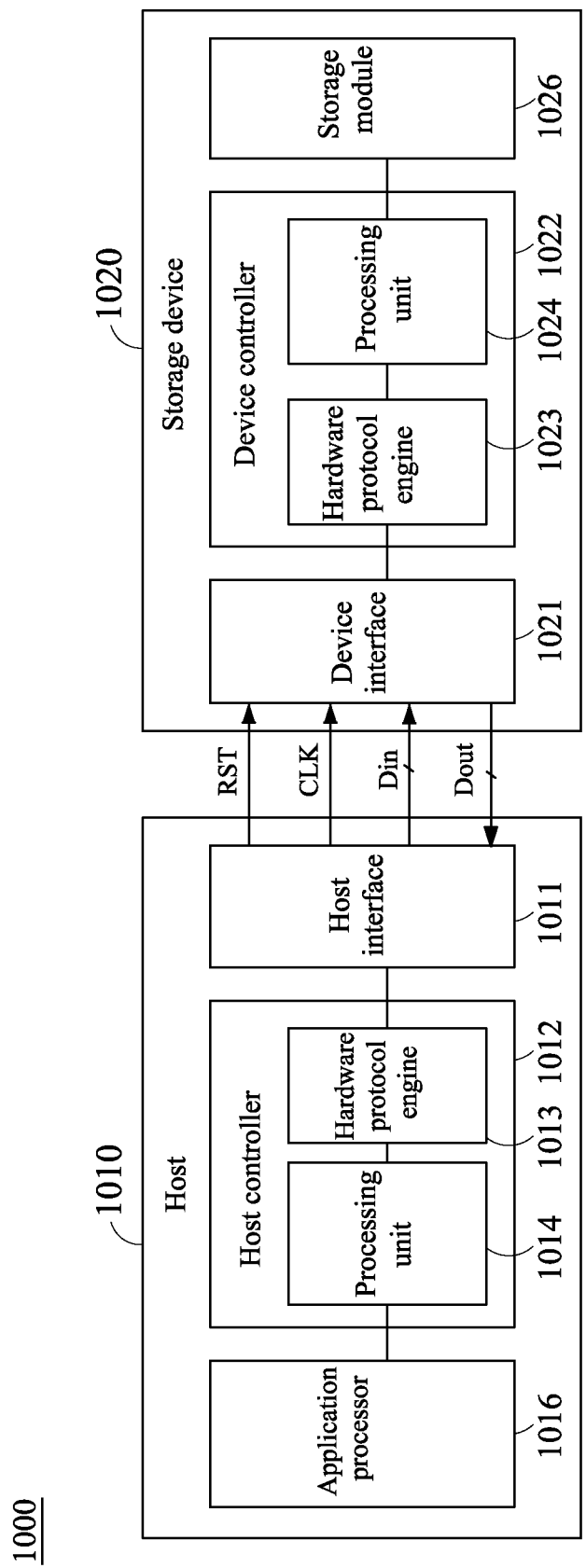
FIG. 12A is a diagram illustrating circuit architecture of a storage system for an interconnection protocol capable of performing ALE according to an embodiment of the present disclosure.
Figure 12B:
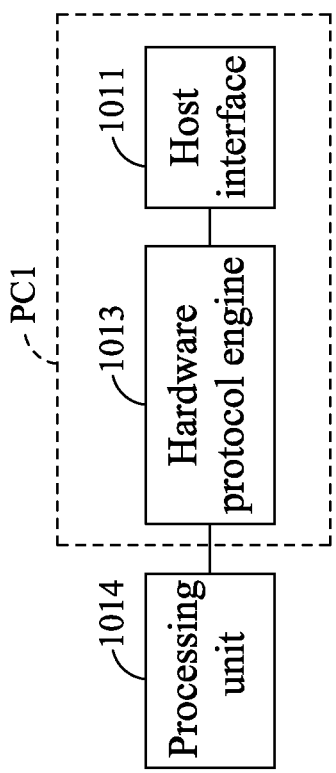
FIG. 12B is a block diagram illustrating circuit architecture applicable to the controller in FIG. 12A for the interconnection protocol according to an embodiment of the present disclosure.
Figure 12C:
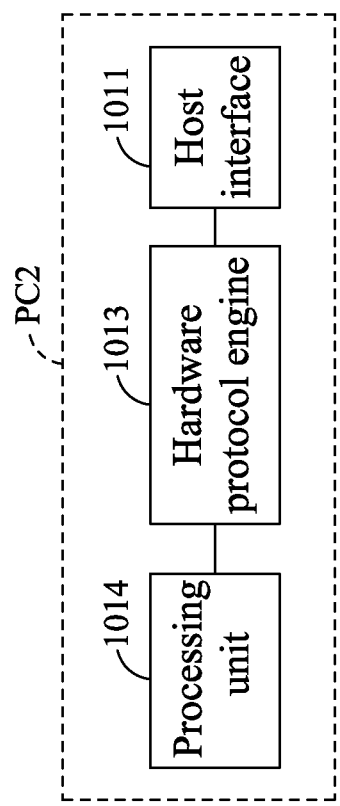
FIG. 12C is a block diagram illustrating circuit architecture applicable to the controller in FIG. 12A for the interconnection protocol according to an embodiment of the present disclosure.

Referring to FIG. 12A, a diagram of circuit architecture is shown according to an embodiment of the present disclosure. As shown in FIG. 12A, a storage system 1000 includes a host 1010 and a storage device 1020. The host 1010 and the storage device 1020 communicate through an interconnection protocol in between, thereby allowing the host 1010 to perform data access of the storage device 1020. The interconnection protocol is capable of performing an ALE as mentioned above based on FIG. 1 or any one or more of the embodiments above. According to the circuit architecture in FIG. 12A, the foregoing technique is applicable to a first device 10 of one or more of the embodiments above capable of communicating with a second device 20 of one or more of the embodiments above according to the interconnection protocol, wherein the host 1010 and storage device 1020 can be used to implement the first device 10 and second device 20 respectively, or vice versa. In the circuit architecture of FIG. 12A, a controller in the host 1010 or the storage device 1020 used to implement the interconnection protocol may be implemented by various configurations. As shown in FIG. 12A, the controller (for example, a host controller 1012) in the host 1010 used to implement the interconnection protocol or the controller (for example, a device controller 1022) in the storage device 1020 used to implement the interconnection protocol can be implemented as circuit architecture including a hardware protocol engine and a processing unit, wherein the processing unit of the controller is optional. In another example, as shown in FIG. 12B, the controller in the host 1010 used to implement the interconnection protocol is referred to as, for example, a protocol controller PC1, which can be configured to include a host interface 1011 and a hardware protocol engine 1013 and be implemented as a single chip, wherein a processing unit 1014 may be regarded as an external circuit of the protocol controller PC1. Moreover, similarly, the controller (or referred to as a protocol controller of the storage device 1020) in the storage device 1020 used to implement the interconnection protocol can be configured to include a device interface 1021 and a hardware protocol engine 1023 and be implemented as a single chip, wherein a processing unit 1024 may be regarded as an external circuit of the protocol controller. For another example, as shown in FIG. 12C, the controller in the host 1010 used to implement the interconnection protocol, for example, a protocol controller PC2, can be configured to include the host interface 1011, the hardware protocol engine 1013 and the processing unit 1014, and be implemented as a single chip. Moreover, similarly, the controller (or referred to as a protocol controller of the storage device 1020) in the storage device 1020 used to implement the interconnection protocol can be configured to include the device interface 1021, the hardware protocol engine 1023, and the processing unit 1024, and be implemented as a single chip. Thus, according to the circuit architecture in FIG. 12A, the controller used to implement the interconnection protocol in the host 1010 or the storage device 1020 can be regarded to cover or represent the embodiment based on FIG. 12A, FIG. 12B, or FIG. 12C. The description of other examples related to FIG. 12A is also suitable for the embodiments based on FIG. 12A, FIG. 12B, or FIG. 12C.

The circuit architecture shown in FIG. 12A has sufficient flexibilities and can be efficiently configured to meet requirements of different products, so as to adapt to diversified designs of manufacturers for better product development. The host 1010 is, for example, a computing device such as a smartphone, a tablet computer, a multimedia device, or other electronic devices. The storage device 1020 is, for example, a storage device inside or outside the computing device, and is such as a storage device based on a non-volatile memory. The storage device 1020 is capable of being written with data under control of the host 1010 or providing written data to the host 1010. The storage device 1020 can be implemented as an internal memory device, memory card, solid state drive (SSD), or so on; however, the implementation of the present disclosure is not limited to the examples above.

The host 1010 includes the host interface 1011, the host controller 1012, and an application processor 1016.

The host interface 1011 implements a physical layer of the interconnection protocol so as to link to the storage device 1020. For example, the host interface 1011 implements a modified version of physical (M-PHY) layer as exemplified above.

The host controller 1012 is coupled between the host interface 1011 and the application processor 1016. When the application processor 1016 needs to perform data access of the storage device 1020, it sends a corresponding access operation command or write data to the host controller 1012 and communicates with the storage device 1020 through the interconnection protocol, thereby completing data access of the storage device 1020.

The host controller 1012 includes, for example, the hardware protocol engine 1013 and the processing unit 1014, wherein the processing unit 1014 is optional.

The hardware protocol engine 1013 implements a link layer of the interconnection protocol. The link layer can be implemented according to a modified version of UniPro as exemplified above. The hardware protocol engine 1013 communicates with the host interface 1011 and the processing unit 1014 and performs data conversion according to the specification of the link layer.

The processing unit 1014 is coupled to the hardware protocol engine 1013, and communicates with the application processor 1016. The processing unit 1014 can execute one or more pieces of firmware. For example, the processing unit 1014 can be configured to execute a piece of firmware for requesting, facilitating, or conducting an ALE PHY test. For example, the processing unit 1014 is configured to send a test mode request to circuitry (e.g., hardware protocol engine or controller) of the host 1010 operating according to one or more of the embodiments illustrated in FIGS. 6A-8. The processing unit 1014 is configured to obtain information of a test result and check the test result according to the obtained information (e.g., S140, A190, A290). For example, the processing unit 1014 is configured to perform operations of the application 100 involved in a process based on one or more of the embodiments illustrated in FIGS. 9 to 11. For example, in normal memory access operations, an access operation command or write data sent by an operating system, a driver, or an application executed by the application processor 1016 is converted into a command or data in a format compliant with the link layer of the interconnection protocol by a piece of firmware executed by the processing unit 1014, and is then sent to the hardware protocol engine 1013 for processing according to specification of the link layer. Alternatively, read data returned by the storage device 1020 in response to a read command of the host 1010 is returned to the hardware protocol engine 1013 according to the specification of the link layer of the interconnection protocol, and is converted by the corresponding firmware executed by the processing unit 1014 into data in a format that is compliant with and readable by the operating system, driver, or application executed by the application processor 1016. The firmware can be stored, for example, in an internal memory of the processing unit 1014, or be stored in an internal memory of the host controller 1012, wherein the internal memory can include a volatile memory and a non-volatile memory. The processing unit 1014 is optional, that is, the task of the firmware above may be implemented at the hardware protocol engine 1013 by using hardware.

The storage device 1020 includes the device interface 1021, the device controller 1022, and a storage module 1026.

The device interface 1021 implements a physical layer of the interconnection protocol to link to the host 1010. For example, the device interface 1021 is for implementing a modified version of physical (M-PHY) layer as exemplified above.

The device controller 1022 is coupled between the device interface 1021 and the storage module 1026. The device controller 1022 has functions corresponding to or similar to those of the host controller 1012 described above, with respect to the interconnection protocol. When the host 1010 issues and sends an access operation command or write data to the storage device 10 through the interconnection protocol, the device controller 1022 converts the received data into a corresponding access operation command or write data through the interconnection protocol so as to facilitate data access to be performed by the storage module 1026. Alternatively, the device controller 1022 returns, according to the link layer of the interconnection protocol, read data returned by the storage device 1020 in response to the read command of the host 1010 to the host 1010. The storage module 1026 includes, for example, a memory chip of one or more non-volatile memories, and is, for example, a flash memory chip. In one example, the storage device 1020 may further include a flash memory controller. The flash memory controller is coupled between the device controller 1022 and the storage module 1026, and can be configured to control write, read, or erase operations of the storage module 1026, and is capable of performing data exchange with the storage module 1026 through an address bus or a data bus. In another example, the flash memory controller may be further provided in the device controller 1022.

The device controller 1022 includes, for example, the hardware protocol engine 1023 and the processing unit 1024, wherein the processing unit 1024 is optional.

The hardware protocol engine 1023 implements a link layer of the interconnection protocol. The link layer can be implemented according to a modified version of UniPro as exemplified above. The hardware protocol engine 1023 communicates with the device interface 1021 and the processing unit 1024 and performs data conversion according to the specification of the link layer.

The processing unit 1024 is coupled to the hardware protocol engine 1023, and communicates with the host 1010 through the device interface 1021. The processing unit 1024 can execute one or more pieces of firmware. For example, the processing unit 1024 can be configured to execute a piece of firmware for requesting, facilitating, or conducting an ALE PHY test, as similar as the above examples for the processing unit 1014 or performing associated counterpart operations with respect to the processing unit 1014. For example, in normal memory access operations, the processing unit 1024 executes one or more pieces of firmware to communicate with the above flash memory controller, so as to exchange data such as an access operation command, write data or read data between the interconnection protocol and the flash memory controller. The firmware can be stored, for example, in an internal memory of the processing unit 1024, an internal memory of the device controller 1022, or a predetermined storage region of the storage module 1026, wherein the internal memory can include a volatile memory and a non-volatile memory.

As shown in FIG. 12A, the host interface 1011 can be coupled to the device interface 1021, for example, through data lines Din and Dout for transmitting/receiving data, a reset line RST for transmitting a hardware reset signal, and a clock line CLK for transmitting data. The data lines Din and Dout can be implemented in multiple pairs, wherein one pair of data lines Din or one pair of data lines Dout can be referred to as a lane. The host interface 1011 can communicate with the device interface 1021 by using at least one interface protocol based on an advanced line encoding scheme, such as 128b/130b or 128b/132b coding scheme or so on; however, the implementation of the disclosure is not limited to the examples above. Under a modified version of the UFS standard, the host 1010 and the storage device 1020 may also be configured with multiple lanes in between to improve transmission efficiency, wherein either of the directions from the host 1010 to the storage device 1020 or from the storage device 1020 to the host 1010 can support one or more lanes, and the multiple lanes can be selectively set to be active or inactive.

A modified version of the UFS standard is taken as an example of the interconnection protocol with the ALE for illustration. The UFS standard includes a UFS command set (UCS) layer, a UFS transport (UTP) layer, and a UFS interconnect (UIC) layer. The UIC layer includes a link layer and a physical layer. In the interconnection protocol with the ALE, the link layer of the UIC layer can be implemented according to a modified version of the UniPro specification, and the physical layer of the UIC layer can be implemented according to a modified version of the M-PHY specification. Under the interconnection protocol, since the implementations of the modified UniPro and modified M-PHY with respect to the ALE are hidden from the other layers (such as UCS, UTP layers) of the UFS standard, the PHY adapter layer SAP model for ALE as illustrated in FIG. 3 facilitates the implementation of the interconnection protocol with the ALE and reduces its implementation complexity.

Figure 13:
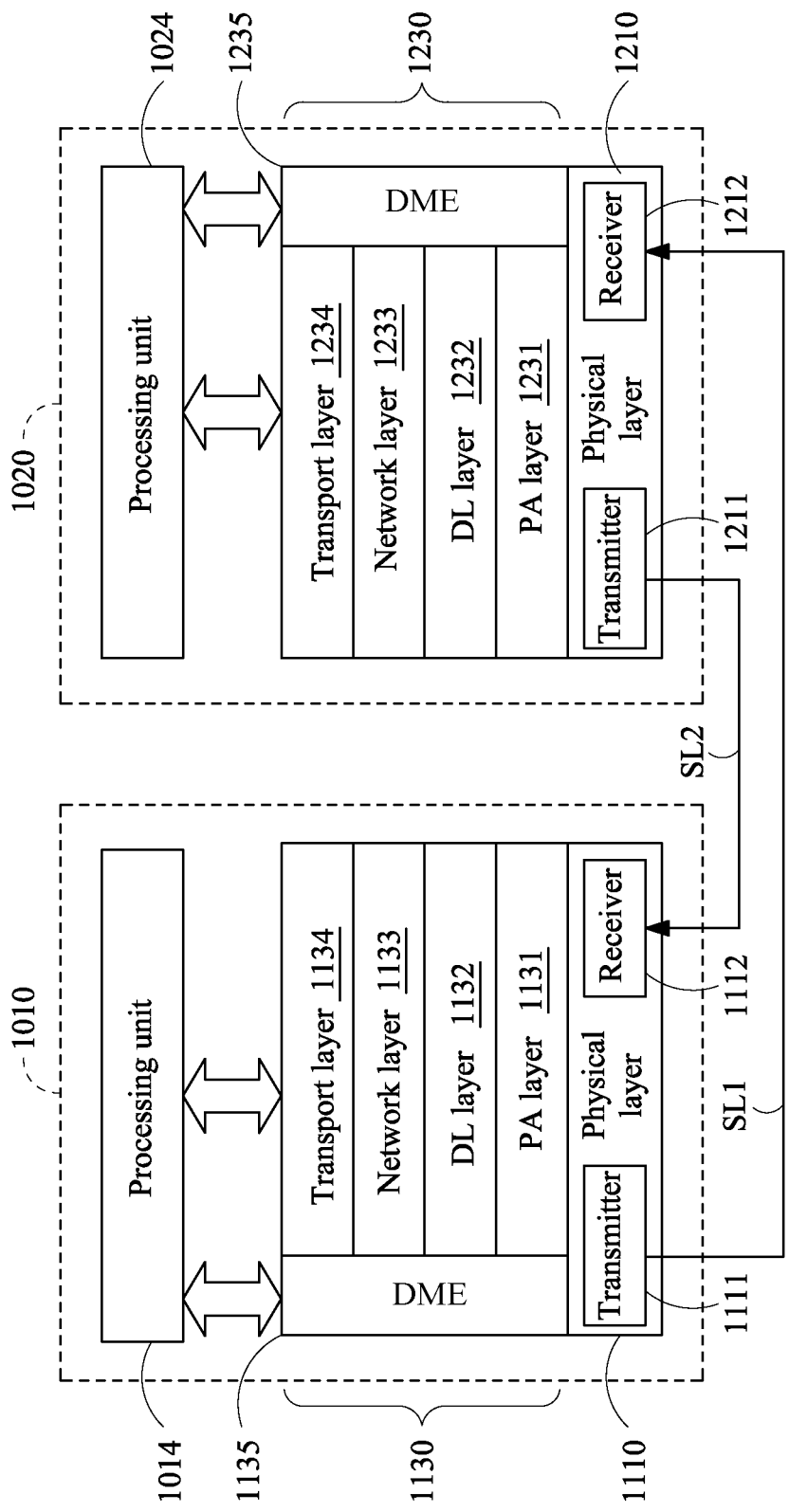
FIG. 13 is a schematic diagram of a layered structure of the storage system in FIG. 12A according to the interconnection protocol capable of performing ALE.

Referring to FIG. 13, a schematic diagram of layered architecture of the storage system in FIG. 12A is shown according to the UFS standard and FIG. 1. Because the UFS standard is based on the MIPI UniPro layer and the MIPI M-PHY layer, the host interface 1011 and the hardware protocol engine 1013 of the host 1010 shown in FIG. 12A are respectively used to implement a modified physical layer 1110 and a modified UniPro layer 1130 in FIG. 13. The modified physical layer 1110 and modified UniPro layer 1130 are the corresponding layers in the host as shown in FIG. 1. Also, the device interface 1021 and the hardware protocol engine 1023 of the storage device 1020 in FIG. 12A are respectively used to implement a modified physical layer 1210 and a modified UniPro layer 1230 in FIG. 13. Likewise, the modified physical layer 1210 and modified UniPro layer 1230 are the corresponding layers in the device as shown in FIG. 1.

As shown in FIG. 13, the modified UniPro layer 1130 (or 1230) can include a modified PHY adapter (PA) layer 1131 (or 1231), a data link (DL) layer 1132 (or 1232), a network layer 1133 (or 1233), and a transport layer 134 (or 1234). The layers in the modified UniPro layer 1230 of the storage device 1020 can also similarly operate and be implemented.

The modified PHY adapter layer (1131 or 1231) couples the modified physical layer (1110 or 1210) to the data link layer (1132 or 1232). The modified PHY adapter layer (1131 or 1231) is capable of performing bandwidth control and power management between the modified physical layer (1110 or 1210) and the data link layer (1132 or 1232). In practice, the modified physical layer 1110 of the host 1010 includes a transmitter (TX) 1111 and a receiver (RX) 1112, and the modified physical layer 1210 of the storage device 1020 includes a transmitter (TX) 1211 and a receiver (RX) 1212, thereby establishing data lanes SL1 and SL2 to perform full duplex communication. The modified UniPro specification may support multiple data lanes for a link in each transmission direction (for example, forward or backward).

The data link layer (1132 or 1232) is capable of performing flow control of data transmission between the host 1010 and the storage device 1020. The data link layer is capable of performing error detection and re-transmission of a frame in case of errors, according to one or more of the embodiments above.

The network layer (1133 or 1233) is used to select a routing function for a transmission path for the packets received from the transport layer (1134 or 1234).

The transport layer (1134 or 1234) can use a command received from the UFS application layer to configure a data segment suitable for the protocol and transmit the data segment to the network layer (1133 or 1233), or can extract a command from packets received from the network layer (1133 or 1233) and transmit the command to the UFS application layer.

Moreover, the modified UniPro layer (1130 or 1230) can be further implemented with a device management entity (DME) (1135 or 1235), which can communicate with the layers in the modified physical layer (1110 or 1210) and the modified UniPro layer (1130 or 1230), for example, the modified PHY adapter layer (1131 or 1231), the data link layer (132 or 232), the network layer (1133 or 1233), and the transport layer (1134 or 1234), so as to communicate with the UFS application layer, thereby implementing the modified unified protocol (UniPro) overall functions such as control or configuration functions including power-on, power-off, reset, and power consumption mode change.

Figure 14:
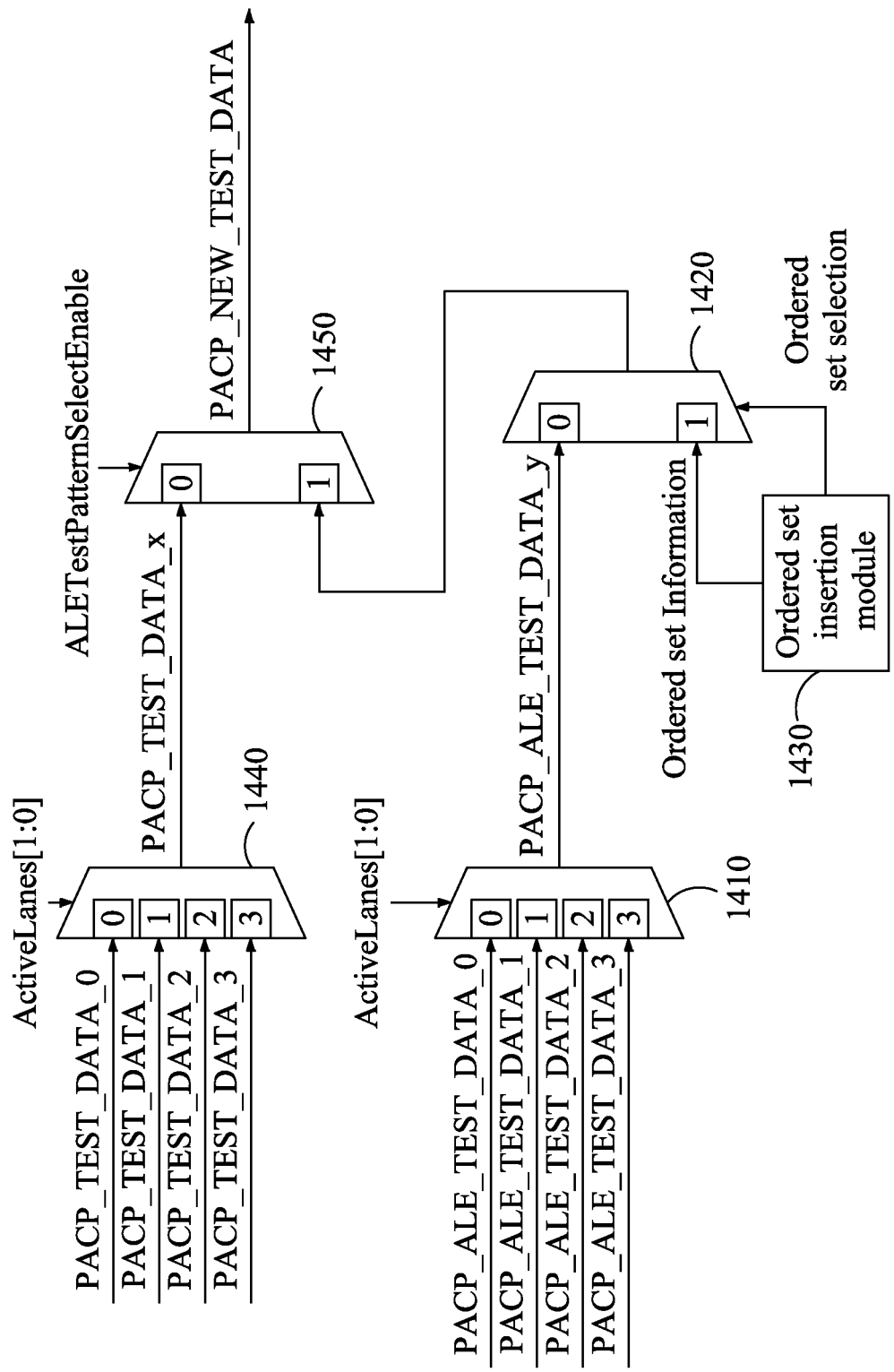
FIG. 14 is a schematic diagram illustrating embodiments of implementation of circuitry for outputting test data.

FIG. 14 illustrates embodiments of implementation of circuitry for outputting test data. In an embodiment where ALE-mode test pattern is supported, a multiplexer 1410 is used for selecting one of PACP_ALE_TEST_DATA_0, PACP_ALE_TEST_DATA_1, PACP_ALE_TEST_DATA_2, and PACP_ALE_TEST_DATA_3 according to a selection signal indicating which one of a specific number of lanes is active, for example, denoted by ActiveLanes[1:0] to indicate which one of up to 4 lanes is active, and the multiplexer 1410 outputs PACP_ALE_TEST_DATA_y, wherein ActiveLanes[1:0] may have a value of 0, 1, 2, or 3 to indicate lane 0, lane 1, lane 2, or lane 3 being active, respectively. PACP_ALE_TEST_DATA_y are exemplified in TABLES 5-6 and related examples. A multiplexer 1420 has two input terminals, one of which is coupled to the output terminal of the multiplexer 1410 and another one of which is coupled to an output terminal of an ordered set insertion module 1430. The multiplexer 1420 is used for selecting either the PACP_ALE_TEST_DATA_y from the multiplexer 1410 or ordered set information from the ordered set insertion module 1430 according to a selection signal indicating an ordered set selection. When the selection signal indicating the ordered set selection is asserted (e.g., having a value equal to '1'), the ordered set information from the ordered set insertion module 1430 is selected as an output of the multiplexer 1420. When the selection signal indicating the ordered set selection is de-asserted (e.g., having a value equal to '0'), the PACP_ALE_TEST_DATA_y from the multiplexer 1410 is selected as an output of the multiplexer 1420. By using the circuit including the multiplexers 1410 and 1420, and ordered set insertion module 1430, the test pattern ALE_COMP_x (e.g., x is 1, 2, 3, or 4) can be implemented. In addition, the ordered set insertion module 1430 can be implemented as a circuit to generate an ordered set, such as {SKP OS+SDS OS} or {SKP OS}, as exemplified in the embodiments related to PA_ALE_LANE_ALIGN.

In another embodiment where HS-mode test pattern is supported in addition to ALE-mode test pattern, a multiplexer 1440 is further used to select one of PACP_TEST_DATA_0, PACP_TEST_DATA_1, PACP_TEST_DATA_2, PACP_TEST_DATA_3 according to a selection signal, for example, ActiveLanes[1:0], and the multiplexer 1440 outputs PACP_TEST_DATA_x. PACP_TEST_DATA_x are exemplified as described in the UniPro specification (e.g., UniPro version 2.0). A multiplexer 1450 has two input terminals, one of which is coupled to the output terminal of the multiplexer 1440 and another one of which is coupled to an output terminal of the multiplexer 1420. The multiplexer 1450 is used for selecting either the PACP_TEST_DATA_x from the multiplexer 1440 or the output from the multiplexer 1420 according to a selection signal indicating whether ALE test pattern selection is enabled, for example, denoted by ALETestPatternSelectEnable (i.e., b6 of attribute PA_PHYTestControl) as described in TABLE 4. When ALETestPatternSelectEnable is asserted (e.g., having a value equal to '1'), the output from the multiplexer 1420 is selected as an output of the multiplexer 1450, denoted by PACP_NEW_TEST_DATA. When ALETestPatternSelectEnable is de-asserted (e.g., having a value equal to '0'), the PACP_TEST_DATA_x from the multiplexer 1440 is selected as an output of the multiplexer 1450, for example, denoted by PACP_NEW_TEST_DATA. By using the circuit including the multiplexers 1410, 1420, 1440, 1450, and ordered set insertion module 1430, test data generated according to the ALE test pattern ALE_COMP_x (e.g., x is 1, 2, 3, or 4) or HS-mode test pattern can be implemented selectively.

The above embodiments of FIG. 14 can be implemented in the PA layer (e.g., 1131 or 1231) of FIG. 13.

Further, one or more of the methods or processes in FIGS. 6A, 7, 8, 9, 10, and 11 can be implemented in the host 1010 and storage device 1020, or in the corresponding PA layer of FIG. 13 and so on.

In the present disclosure, "asserting" a signal (or other alternative forms such as "asserted" or "assertion") means that a signal is set to be in an active state (or an active voltage level), which may be a high or low level. "De-asserting" a signal (or other alternative forms such as "de-asserted" or "de-assertion") means that a signal is set to be in an inactive state (or an inactive voltage level), which may be a high or low level. If a signal is set to be at a low level to represent active-low, "asserting" the signal means that the signal is set to a low level, and "de-asserting" the signal means that the signal is set to a high level. If a signal is set to be at a high level to represent active-high, "asserting" a signal means that the signal is set to a high level, and "de-asserting" the signal means that the signal is set to a low level.

Moreover, in the embodiments related to the host and the storage device above, the hardware protocol engine in the host controller or the device controller can be designed based on Hardware Description Language (HDL) such as Verilog or techniques of any other design methods of digital circuits generally known to a person skilled in the art, and can be implemented by one or more of circuits based on such as a field programmable gate array (FPGA), an application-specific integrated circuit (ASIC), or a complex programmable logic device (CPLD), or be implemented by a dedicated circuit or module. The host controller or the device controller (or a processing unit or a hardware protocol engine therein) can also be based on a microcontroller, a processor, or a digital signal processor (DSP).

As described above, various embodiments of a method for an interconnection protocol capable of performing an advanced line coding, a controller, and an electronic device (such as a host or a storage device) are provided.

The present disclosure is described by using the embodiments above. A person skilled in the art should understand that, these embodiments are merely for describing the present disclosure are not to be construed as limitations to the scope of the present disclosure. It should be noted that all equivalent changes, replacements and substitutions made to the embodiments are to be encompassed within the scope of the present disclosure. Therefore, the scope of protection of the present disclosure should be accorded with the broadest interpretation of the appended claims.

What is claimed is:

1. A method of facilitating testing for an interconnection protocol, the method comprising:
at a controller of the electronic device, in response to receiving a test mode request signal, entering a test mode in which data transmission is performed using advanced line encoding;
generating, by the controller using the advanced line encoding, a test pattern including an ordered set including a first ordered set pattern and a data pattern including a first data pattern; and
transmitting the test pattern according to the advanced line encoding from the electronic device to a second electronic device, wherein the first ordered set pattern is transmitted for symbol alignment before the first data pattern is transmitted.

2. The method according to claim 1, wherein the ordered set further includes a second ordered set pattern and the data pattern further includes a second data pattern, wherein the second ordered set pattern and the second data pattern are transmitted after the first ordered set pattern and the first data pattern are transmitted, and the second ordered set pattern is transmitted for symbol alignment before the second data pattern is transmitted.

3. The method according to claim 2, wherein the second ordered set pattern is utilized to perform bit shift alignment.

4. The method according to claim 1, wherein the first ordered set pattern includes a first ordered set and a second ordered set, and the first ordered set is transmitted for symbol alignment before the second ordered set is transmitted for scrambling seed reset for the first data pattern.

5. The method according to claim 1, wherein, before the test pattern is transmitted, the data pattern is scrambled, and the ordered set is not scrambled.

6. The method according to claim 1, wherein the first ordered set pattern is utilized to perform symbol lock.

7. A controller comprising:
a hardware protocol engine configured to enter a test mode in which data transmission is performed using advanced line encoding and configured to generate a test pattern including an ordered set including a first ordered set pattern and a data pattern including a first data pattern; and
an interface circuit configured to transmit the test pattern according to the advanced line encoding in the test mode to a second electronic device, wherein the first ordered set pattern is transmitted for symbol alignment before the first data pattern is transmitted.

8. The controller according to claim 7, wherein the ordered set further includes a second ordered set pattern and the data pattern portion further includes a second data pattern, wherein the second ordered set pattern and the second data pattern are transmitted after the first ordered set pattern and the first data pattern are transmitted, and the second ordered set pattern is transmitted for symbol alignment before the second data pattern is transmitted.

9. The controller according to claim 8, wherein the second ordered set pattern is utilized to perform bit shift alignment.

10. The controller according to claim 7, wherein the first ordered set pattern includes a first ordered set and a second ordered set, wherein the first ordered set is transmitted for symbol alignment before the second ordered set is transmitted for scrambling seed reset for the first data pattern.

11. The controller according to claim 7, wherein the controller is further configured to, during the test mode, scramble the data pattern, and wherein the ordered set is not scrambled before the test pattern is transmitted.

12. The controller according to claim 7, wherein the first ordered set pattern is utilized to perform symbol lock.

13. An electronic device comprising:
a processing unit; and
a controller, coupled to the processing unit, configured to enter a test mode in which data transmission is performed using advanced line encoding, configured to generate a test pattern including a ordered set including a first ordered set pattern and a data pattern including a first data pattern, and configured to transmit the test pattern according to the advanced line encoding in the test mode to a second electronic device, wherein the first ordered set pattern is transmitted for symbol alignment before the first data pattern is transmitted.

14. The electronic device according to claim 13,
wherein the ordered set further includes a second ordered set pattern and the data pattern further includes a second data pattern, wherein the controller is configured to transmit the second ordered set pattern and the second data pattern after the first ordered set pattern and the first data pattern are transmitted, and the controller is configured to transmit the second ordered set pattern for symbol alignment before transmitting the second data pattern.

15. The electronic device according to claim 14, wherein the second ordered set pattern is utilized to perform bit shift alignment.

16. The electronic device according to claim 13, wherein the first ordered set pattern includes a first ordered set and a second ordered set, wherein the controller is configured to transmit the first ordered set for symbol alignment before transmitting the second ordered set for scrambling seed reset for the first data pattern.

17. The electronic device according to claim 13, wherein the controller is further configured to, during the test mode, scramble the data pattern before the data pattern is transmitted, and wherein the ordered set is not scrambled.

18. The electronic device according to claim 13, wherein the processing unit is configured to send a test mode request signal to the controller to request entering the test mode.

19. The electronic device according to claim 13, wherein the processing unit is configured to obtain information including a test result associated with the test pattern and check the test result according to the information.

20. The electronic device according to claim 13, wherein the first ordered set pattern is utilized to perform symbol lock.

* * * * *